United States Patent
Horie et al.

(10) Patent No.: US 8,114,496 B2
(45) Date of Patent: Feb. 14, 2012

(54) OPTICAL RECORDING MEDIUM

(75) Inventors: Michikazu Horie, Minato-ku (JP);
Kenjirou Kiyono, Minato-ku (JP);
Masae Kubo, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 761 days.

(21) Appl. No.: 12/160,856

(22) PCT Filed: Jan. 11, 2007

(86) PCT No.: PCT/JP2007/050275
§ 371 (c)(1),
(2), (4) Date: Oct. 17, 2008

(87) PCT Pub. No.: WO2007/080937
PCT Pub. Date: Jul. 19, 2007

(65) Prior Publication Data
US 2009/0269540 A1 Oct. 29, 2009

(30) Foreign Application Priority Data
Jan. 13, 2006 (JP) .............................. 2006-006567

(51) Int. Cl.
*B32B 3/02* (2006.01)
(52) U.S. Cl. .................... 428/64.1; 428/64.4; 428/64.8; 430/270.14
(58) Field of Classification Search .................. None
See application file for complete search history.

(56) References Cited

U.S. PATENT DOCUMENTS

| | | |
|---|---|---|
| 5,090,009 A | 2/1992 | Hamada et al. |
| 5,882,760 A * | 3/1999 | Hatwar et al. ............... 428/64.1 |
| 6,268,034 B1 | 7/2001 | Kitaura et al. |
| 7,129,019 B2 * | 10/2006 | Kakuta et al. ............ 430/270.16 |
| 2002/0076648 A1 | 6/2002 | Berneth et al. |
| 2003/0138728 A1 | 7/2003 | Saito |
| 2004/0058274 A1 | 3/2004 | Fukuzawa et al. |
| 2004/0142138 A1 | 7/2004 | Fukuzawa |

(Continued)

FOREIGN PATENT DOCUMENTS

CN 1245330 A 2/2000

(Continued)

OTHER PUBLICATIONS

Office Action issued Jan. 5, 2011 in Japan Application No. 2007-004696 (With English Translation).

(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

Provided is an extremely high-density optical recording medium with excellent jitter characteristics and good recording/reproducing characteristics.

An optical recording medium 20 comprises a substrate 21 with a guide groove formed therein, a layer 23 with a light reflection function, a recording layer 22 comprising a dye as a main component with a light absorption function for a wavelength of recording/reproducing light in an unrecorded state, and a cover layer 24 capable of transmitting the recording/reproducing light incident to the recording layer 22, in the order mentioned; an interlayer 30 containing at least one element selected from the group consisting of Ta, Nb, V, W, Mo, Cr and Ti, is provided between the layer 23 with the light reflection function and the recording layer 22.

18 Claims, 6 Drawing Sheets

U.S. PATENT DOCUMENTS

| | | |
|---|---|---|
| 2005/0226135 A1 | 10/2005 | Morita et al. |
| 2006/0204706 A1 | 9/2006 | Horie et al. |

FOREIGN PATENT DOCUMENTS

| | | |
|---|---|---|
| CN | 1700322 A | 11/2005 |
| EP | 1 598 818 A1 | 11/2005 |
| EP | 1 764 794 A1 | 3/2007 |
| JP | 57-501980 | 11/1982 |
| JP | 59-19253 | 1/1984 |
| JP | 2-87339 | 3/1990 |
| JP | 2-132656 | 5/1990 |
| JP | 2-168446 | 6/1990 |
| JP | 2-187939 | 7/1990 |
| JP | 3-22224 | 1/1991 |
| JP | 3-52142 | 3/1991 |
| JP | 3-54744 | 3/1991 |
| JP | 3-63943 | 3/1991 |
| JP | 4-182944 | 6/1992 |
| JP | 5-128589 | 5/1993 |
| JP | 5-174380 | 7/1993 |
| JP | 6-4901 | 1/1994 |
| JP | 8-138245 | 5/1996 |
| JP | 9-277703 | 10/1997 |
| JP | 10-36693 | 2/1998 |
| JP | 11-25523 | 1/1999 |
| JP | 11-273147 | 10/1999 |
| JP | 2000-43423 | 2/2000 |
| JP | 2000-207772 | 7/2000 |
| JP | 2001-155383 | 6/2001 |
| JP | 2001-273672 | 10/2001 |
| JP | 2001-287465 | 10/2001 |
| JP | 2001-287466 | 10/2001 |
| JP | 2002-245678 | 8/2002 |
| JP | 2002-301870 | 10/2002 |
| JP | 2002-367219 | 12/2002 |
| JP | 2003-16689 | 1/2003 |
| JP | 2003-217173 | 7/2003 |
| JP | 2003-217177 | 7/2003 |
| JP | 2003-266954 | 9/2003 |
| JP | 2003-272232 | 9/2003 |
| JP | 2003-303442 | 10/2003 |
| JP | 2003-331465 | 11/2003 |
| JP | 2004-1375 | 1/2004 |
| JP | 2004-30864 | 1/2004 |
| JP | 2004-86932 | 3/2004 |
| JP | 2004-98542 | 4/2004 |
| JP | 2004 127460 | 4/2004 |
| JP | 2004-160742 | 6/2004 |
| JP | 2005-504649 | 2/2005 |
| JP | 2005 280185 | 10/2005 |
| JP | 2005 293842 | 10/2005 |
| JP | 2005 297407 | 10/2005 |
| JP | 2005 530286 | 10/2005 |
| JP | 2006 4588 | 1/2006 |
| TW | 200522057 | 7/2005 |
| WO | WO 01/74600 | 10/2001 |
| WO | WO 03/003361 | 1/2003 |
| WO | WO 2006/004119 A1 | 1/2006 |

OTHER PUBLICATIONS

A. H. M. Holtslag, et al., "Recording Mechanism of Overcoated Metallized Dye Layers on Polycarbonate Substrates", Proceedings of International Symposium on Optical Memory, vol. 4, 1991, pp. 99-108.

Erwin R. Meinders, et al., "Recent Developments in Thermal Modelling of High-Speed Dye Recording", Japanese Journal of Applied Physics, vol. 42, No. 2B, Feb. 2003, pp. 834-840.

Isao Ichimura, et al., "On-groove phase-change optical recording for a capacity of 25 GB", Proceedings of SPIE, vol. 4342, 2002, pp. 168-177.

Yuichi Sabi, et al., "Development of Organic Recording Media for Blue High Numerical Aperture Optical Disc System", Japanese Journal of Applied Physics, vol. 42, No. 2B, Feb. 2003, pp. 1056-1058.

Heitaro Nakajima, et al., Compact Disc Technology, Revised Third Edition, Ohmsha, 1996, 4 pages.

Shoei Kobayashi, et al., "Wobble-Address Format of the Blu-ray Disc", Japanese Journal of Applied Physics, vol. 42, No. 2B, Feb. 2003, pp. 915-918.

Michel M. J. Decré, et al., "Cover Layer Technology for the High-Numerical-Aperture Digital Video Recording System", Japanese Journal of Applied Physics, vol. 39, No. 2B, Feb. 2000, pp. 775-778.

Bert Stek, et al., "Advanced Signal Processing for the Blu-ray Disc System", Japanese Journal of Applied Physics, vol. 42, No. 2B, Feb. 2003, pp. 912-914.

Optical Disc Kaitai Shinsho, edited by Nikkei Electronics, Nikkei Business Publications, Inc., 2003, Third Chapter.

Hiroyuki Fujiwara, Spectral Ellipsometry, Maruzen Company, 2003, Fifth Chapter.

Alphonsus V. Pocius, "Adhesion and Adhesives Technology", Introductory Book, translated by Hiroshi Mizumachi, Hirokuni Ono, The Nikkan Kogyo Shinbun, Ltd., 1999.

U.S. Appl. No. 12/440,247, filed Mar. 6, 2009, Kubo, et al.

Office Action issued Sep. 20, 2010 in Taiwanese Application No. 096101326 (With English Translation).

* cited by examiner

OPTICAL RECORDING MEDIUM

TECHNICAL FIELD

The present invention relates to an optical recording medium and, more particularly, to an optical recording medium having a dye-containing recording layer.

BACKGROUND ART

In recent years, blue lasers permitting ultrahigh density recording have been rapidly developed and WORM (write-once read-many) optical recording media compatible therewith are under development. Among others, there are strong demands for development of a dye coating type WORM medium enabling efficient production at relatively low cost. In a conventional dye coating type WORM optical recording medium, a laser beam is applied to a recording layer of an organic compound containing a dye as a main component, to mainly cause an optical (refractive index or absorptance) change based on decomposition or alteration of the organic compound, thereby forming a recording pit. The recording pit part does not involve only the optical change, but also it normally involves deformation based on a change in volume of the recording layer, formation of a mixed region of a substrate and the dye due to generation of heat, deformation of the substrate (mainly, a rise due to expansion of the substrate), and so on (cf. Patent Document 1, Patent Document 2, Patent Document 3, and Patent Document 4).

Factors important for formation of a good recording pit include optical behavior of the organic compound used in the recording layer, to a wavelength of a laser used for recording or reproduction, and thermal behavior thereof such as decomposition or sublimation, and generation of heat occurring therewith. Therefore, the organic compound used in the recording layer is selected from materials with appropriate optical properties and decomposition behavior.

In the first place, the conventional WORM media, particularly, CD-R and DVD-R are designed to achieve a reflectance of about 60% or more and, similarly, a high modulation index over about 60%, in order to maintain reproduction compatibility with read-only recording media (ROM media) in which depressed pits preliminarily formed on a substrate are covered by a reflecting layer of Al, Ag, Au, or the like. First, the optical properties of the recording layer are defined for achieving a high reflectance in an unrecorded state. Normally, required values are the refractive index n of at least about 2 and the extinction coefficient of approximately from 0.01 to 0.3 in the unrecorded state (cf. Patent Document 5 and Patent Document 6).

With a recording layer containing a dye as a main component, it is difficult to achieve a high modulation index of at least 60% by only change in the optical properties due to recording. Namely, a dye as an organic substance can exhibit limited change amounts of the refractive index n and absorptance k, and there is thus a limit to change in the reflectance in a planar state.

Therefore, a method used is to apparently increase reflectance change (reflectance decrease) in the recording pit part, using interference effect between reflections from two parts based on a phase-difference between reflected light from the recording pit part and reflected light from an unrecorded part. In other words, the method is based on a principle similar to that of phase-difference pits as in the ROM media, and in the case of the organic recording layer with change in refractive index smaller than those of inorganic substances, it is reported that it is rather advantageous to mainly use the reflectance change based on the phase-difference (cf. Patent Document 7). Furthermore, there is a study with comprehensive consideration to the above-mentioned recording principle (cf. Non-patent Document 1).

In the description hereinafter, a portion recorded as described above (which is sometimes called a recording mark part) will be referred to as a recording pit, a recording pit part, or a recording pit portion, irrespective of its physical shape.

FIG. 1 is a drawing to illustrate a WORM medium (optical recording medium 10) with a recording layer containing a dye as a main component in a conventional configuration. As shown in FIG. 1, the optical recording medium 10 has the configuration in which at least a recording layer 12, a reflecting layer 13, and a protecting coat layer 14 are formed in the order mentioned, on a substrate 11 with a groove therein, and an objective lens 18 is used to introduce a recording/reproducing light beam 17 into and through the substrate 11 to irradiate the recording layer 12. The thickness of the substrate 11 is normally 1.2 mm (CD) or 0.6 mm (DVD). A recording pit is formed in a portion of a substrate groove part 16 called an ordinary groove, on the near side to a surface 19 which the recording/reproducing light beam 17 enters, but is not formed in a substrate land part 15 on the far side.

It is also reported as to the phase-difference change in the aforementioned background art document that factors contributing to the phase-difference change are maximization of refractive index change between refractive indices before and after recording in the recording layer 12 containing the dye, and shape change of the recording pit part, i.e., effect of local change in the shape of the groove (equivalent change in the depth of the groove due to expansion or depression of the substrate 11) or change in film thickness (transmissive change in film thickness due to expansion or constriction of the recording layer 12), in the recording pit part formed in the groove.

In the recording principle as described above, the wavelength of recording/reproducing light is normally selected as located in a longer-wavelength-side tail of a large absorption band, in order to enhance the reflectance in the unrecorded state and to induce a large refractive index change by decomposition of the organic compound with laser irradiation (which achieves a large modulation index). This is because the longer-wavelength-side tail of the large absorption band is a wavelength region realizing an appropriate extinction coefficient and a large refractive index.

However, there has been no available material with values of the optical properties comparable to those of the conventional materials for the wavelengths of the blue lasers. There are very few organic compounds with the optical constants comparable to those required of the recording layer in the conventional WORM optical recording media, particularly, near 405 nm, which is the center of oscillation wavelengths of the blue semiconductor lasers now in practical use, and such a material is still in a stage of search. Furthermore, in the case of the WORM optical recording media having the conventional dye recording layer, a main absorption band of the dye exists near the wavelength of recording/reproducing light, and therefore the optical constants thereof come to have a large wavelength dependence (i.e., the optical constants largely vary depending upon wavelengths), which raises a problem of significant change in recording characteristics such as recording sensitivity, modulation index, jitter, and an error rate, in reflectance, and so on against variation in the wavelength of recording/reproducing light due to individual differences of lasers, change in ambient temperature, and so on.

For example, there is a report on an idea of recording using a dye recording layer showing absorption near 405 nm, but the dye used therein is required to have the same optical characteristics and functions as those of conventional dyes; therefore, it is entirely dependent on search and discovery of a high-performance dye (cf. Patent Document 8 and Patent Document 9). Furthermore, it is reported as to the WORM optical recording medium 10 using the recording layer 12 containing the conventional dye as a main component, as shown in FIG. 1, that it is also necessary to appropriately control a groove shape and a distribution of thicknesses of the recording layer 12 in the substrate groove part 16 and in the substrate land part 15 (cf. Patent Document 10, Patent Document 11, and Patent Document 12).

Namely, in terms of securing the high reflectance as described above, it is possible to use only a dye with a relatively small extinction coefficient (approximately from 0.01 to 0.3) for the wavelength of recording/reproducing light. For this reason, it is impossible to decrease the film thickness of the recording layer 12, in order to obtain optical absorption necessary for recording in the recording layer 12 and to achieve a large change in the phase-difference between phases before and after recording. As a consequence, the film thickness of the recording layer 12 is normally determined to be a thickness approximately equal to $\lambda/(2 n_s)$ (where $n_s$ represents the refractive index of the substrate 11), and it is desirable to use the substrate 11 with a deep groove, in order to embed the dye of the recording layer 12 in the groove and to reduce crosstalk.

Since the recording layer 12 containing the dye is normally formed by a spin coat method (coating method), it is actually convenient to embed the dye in the deep groove and to increase the thickness of the recording layer 12 in the groove part. On the other hand, the coating method results in making a difference between film thicknesses of the recording layer in the substrate groove part 16 and in the substrate land part 15, and this difference between film thicknesses of the recording layer is advantageous in that a stable tracking servo signal is obtained even with use of the deep groove.

Namely, it is infeasible to maintain a good signal characteristic in the recording pit part and a good tracking signal characteristic together unless the groove shape defined by the surface of the substrate 11 and the groove shape defined by the interface between the recording layer 12 and the reflecting layer 13 in FIG. 1 are kept both at appropriate values.

The depth of the groove is normally determined to be preferably close to $\lambda/(2n_s)$ (where $\lambda$ represents the wavelength of the recording/reproducing light beam 17 and $n_s$ the refractive index of the substrate 11) and is determined in the range of about 200 nm for CD-R and about 150 nm for DVD-R. It is very difficult to form the substrate 11 with such a deep groove and this is a cause to degrade the quality of the optical recording medium 10.

Particularly, in the case of the optical recording medium used with the blue laser beam, when $\lambda=405$ nm, it is necessary to use a deep groove of approximately 100 nm and it is often the case that the track pitch is set in a range of from 0.2 μm to 0.4 μm, in order to achieve a high density. It is much more difficult to form such a deep groove at the narrow track pitch and it is practically impossible to realize mass production with conventional polycarbonate resin. Namely, in the case of the medium used with the blue laser beam, mass production is quite likely to become impossible in the conventional configuration.

Furthermore, the examples described in the aforementioned background art documents are mostly examples using the conventional configuration (substrate incidence configuration) represented by the optical recording medium 10 shown in FIG. 1. In order to realize high-density recording with the blue laser, however, attention is being drawn to a configuration so called film-surface-incidence and there is a report on a configuration using an inorganic material recording layer such as a phase-change type recording layer (cf. Non-patent Document 3).

In the configuration called the film-surface-incidence, opposite to the conventional configuration, at least a reflecting layer, a recording layer, and a cover layer are formed in the order mentioned, on a substrate with a groove therein, and a focused laser beam for recording/reproduction is introduced into and through the cover layer to irradiate the recording layer.

The thickness of the cover layer is normally approximately 100 μm in a so-called Blu-Ray Disc (cf. Non-patent Document 9). The reason why the recording/reproducing light is introduced from such a thin cover layer side is that the objective lens used for focusing of the beam has a numerical aperture (NA which is normally from 0.7 to 0.9, and is 0.85 for the Blu-Ray Disc) higher than those before. With use of the objective lens having the high NA (numerical aperture), the required thickness of the cover layer is as thin as approximately 100 μm, in order to keep down influence of aberration due to the thickness of the cover layer. There are many reports of examples about such blue wavelength recording and film-surface-incidence configuration (cf. Non-patent Document 4 and Patent Documents 13-24). There are also many reports on related technologies (cf. Non-patent Documents 5-8 and Patent Documents 25-43).

Non-patent Document 1: Proceedings of International Symposium on Optical Memory, U.S.A., Vol. 4, 1991, pp. 99-108

Non-patent Document 2: Japanese Journal of Applied Physics, Japan, Vol. 42, 2003, pp. 834-840

Non-patent Document 3: Proceedings of SPIE, U.S.A., Vol. 4342, 2002, pp. 168-177

Non-patent Document 4: Japanese Journal of Applied Physics, Japan, Vol. 42, 2003, pp. 1056-1058

Non-patent Document 5: Compact Disc Technology, co-authored by Heitaro Nakajima and Hiroshi Ogawa, revised third edition, Ohmaha, 1996, p. 168

Non-patent Document 6: Japanese Journal of Applied Physics, Japan, Vol. 42, 2003, pp. 914-918

Non-patent Document 7: Japanese Journal of Applied Physics, Japan, Vol. 39, 2000, pp. 775-778

Non-patent Document 8; Japanese Journal of Applied Physics, Japan, Vol. 42, 2003, pp. 912-914

Non-patent Document 9: Optical Disc Kaitai Shinsho, edited by NIKKEI ELECTRONICS, Nikkei Business Publications, Inc., 2003, third chapter Non-patent Document 10: Spectral Ellipsometry, authored by Hiroyuki Fujiwara, Maruzen Company, 2003, fifth chapter Non-patent Document 11: Adhesive and Adhesion Technology Introductory Book authored by Alphonsus V. Pocius, and translated by Hiroshi Mizumachi, Hirokuni Ono, THE NIKKAN KOGYO SHINBUN, LTD., 1999

Patent Document 1: JP-A-2-168446
Patent Document 2: JP-A-2-187939
Patent Document 3: JP-A-3-52142
Patent Document 4: JP-A-3-63943
Patent Document 5: JP-A-2-87339
Patent Document 6: JP-A-2-132656
Patent Document 7: JP-A-57-501980
Patent Document 8: WO 01/74600
Patent Document 9: JP-A-2002-301870
Patent Document 10: JP-A-3-54744

Patent Document 11: JP-A-3-22224
Patent Document 12: JP-A-4-182944
Patent Document 13: JP-A-2003-331465
Patent Document 14: JP-A-2001-273672
Patent Document 15: JP-A-2004-1375
Patent Document 16: JP-A-59-19253
Patent Document 17: JP-A-8-138245
Patent Document 18: JP-A-2004-30864
Patent Document 19: JP-A-2001-273672
Patent Document 20: JP-A-2002-245678
Patent Document 21: JP-A-2001-155383
Patent Document 22: JP-A-2003-303442
Patent Document 23: JP-A-2002-367219
Patent Document 24: JP-A-2003-16689
Patent Document 25: JP-A-5-128589
Patent Document 26: JP-A-5-174380
Patent Document 27: JP-A-6-4901
Patent Document 28: JP-A-2000-43423
Patent Document 29: JP-A-2001-287466
Patent Document 30: JP-A-2003-266954
Patent Document 31: JP-A-9-277703
Patent Document 32: JP-A-10-36693
Patent Document 32: JP-A-2000-207772
Patent Document 34: JP-A-2001-155383
Patent Document 35: JP-A-11-273147
Patent Document 36: JP-A-11-25523
Patent Document 37: JP-A-2003-217173
Patent Document 38: JP-A-2004-86932
Patent Document 39: JP-A-2004-98542
Patent Document 40: JP-A-2004-160742
Patent Document 41: JP-A-2003-217177
Patent Document 42: WO 03/003361
Patent Document 43: JP-A-2005-504649

DISCLOSURE OF THE INVENTION

Object to be Accomplished by the Invention

Incidentally, in a previously developed phase change type medium of the film-surface-incidence type, a recording mark is formed in a cover layer groove part when viewed from the incident light side. This is the same as in the conventional recording in the substrate groove part on the substrate, when viewed from the incident light side, and means that the medium can be realized in much the same layer configuration as CD-RW and DVD-RW, and good characteristics are achieved in fact.

On the other hand, in the case of the recording layer containing the dye as a main component, particularly, in the case of the coating type, it is not easy to implement recording in the cover layer groove part. It is because the dye normally tends to remain in the groove part in the substrate during spin coating thereon. Even if the dye is coated in an appropriate thickness in the substrate land part, a considerable amount of the dye will normally remain in the substrate groove part as well and a recording pit (recording mark) formed in the cover layer groove part will also easily project out to the cover layer land part; this does not allow decrease in the track pitch which can increase crosstalk, and there is a limit to increase in density.

However, most of the aforementioned background art documents are mainly based on decrease in intensity of reflected light by recording in the cover layer groove part on the near side from the incident light side as before. Some give attention to reduction in reflectance simply occurring in the planar state, without consideration to change in phase of reflected light due to a level difference of the groove part. Some are based on the assumption of making use of the reflectance change in the planar shape with little use of the phase-difference. This assumption does not provide any solution to the problem of crosstalk in the recording in the cover layer groove part and is not adaptable for the recording layer forming process by coating with a solution. Further, it cannot be said that good recording characteristics in the cover layer land part are achieved by effectively making use of the phase change. Particularly, there is no example of implementation with a practical recording power margin for all mark lengths from the shortest mark length to the longest mark length in mark length modulation recording, and with good jitter characteristics.

As discussed above, it is the present status that there is no known WORM optical recording medium of the film-surface-incidence type for the blue laser having the recording layer containing the dye as a main component, available with high performance and at low cost comparable to those of the conventional CD-R and DVD-R, yet.

The inventors conducted intensive and extensive research on the film-surface-incidence type media for the blue laser having the recording layer containing the dye as a main component. As a result, the inventors discovered that a film-surface-incidence type medium with good recording characteristics could be obtained by using a guide groove part on the farther side from the surface where the recording/reproducing light beam is incident to the cover layer, as a recording groove part and by making the intensity of reflected light from a recording pit part formed in this recording groove part, higher than the intensity of reflected light from the recording groove part in the unrecorded state (reference should be made as to the detailed description of such film-surface-incidence type optical recording media, to WO 2006/009107 (International Patent Application PCT/JP2005/013145)).

The inventors conducted further research on the basis of the above finding and came to find that it was necessary to make a further improvement, in order to obtain better jitter characteristics.

The present invention has been accomplished for solving the above-mentioned problem.

Namely, an object of the present invention is to provide an extremely high-density optical recording medium with excellent jitter characteristics and good recording/reproducing characteristics.

Means to Accomplish the Object

The inventors of the present invention have intensively and extensively studied the above-mentioned problem and, as a result, found that a blue laser-compatible film-surface incidence type optical recording medium with a recording layer containing a dye as a main component, showed better jitter characteristics when an interlayer was provided between a layer with a light reflection function comprising Ag as a main component and the recording layer.

Namely, the present invention has the following aspects.
(1) An optical recording medium comprising:
a substrate with a guide groove formed therein,
a layer with a light reflection function comprising Ag as a main component, a recording layer comprising a dye as a main component with a light absorption function for a wavelength of recording/reproducing light in an unrecorded state, and a cover layer capable of transmitting the recording/reproducing light incident to the recording layer, in the order mentioned, on the substrate,
wherein an interlayer is provided between the layer with the light reflection function and the recording layer, and wherein the interlayer contains at least one element selected from the group consisting of Ta, Nb, V, W, Mo, Cr and Ti.

(2) The optical recording medium according to the above aspect (1), wherein the interlayer has a thickness of at least 1 nm and at most 15 nm.

(3) The optical recording medium according to the above aspect (1), wherein the layer with the light reflection function comprising Ag as a main component has a thickness of at least 30 nm and at most 90 nm.

(4) The optical recording medium according to any one of the above aspects (1) to (3), wherein when a recording groove part is a guide groove part on the far side from a surface where a recording/reproducing light beam resulting from focusing of the recording/reproducing light is incident to the cover layer, a reflected light intensity of a recorded pit portion formed in the recording groove part is higher than a reflected light intensity of the recording groove part in the unrecorded state.

(5) The optical recording medium according to the above aspect (4), wherein the recording layer has a thickness of at least 5 nm and at most 70 nm in the recording groove part in the unrecorded state.

(6) The optical recording medium according to the above aspect (4) or (5), wherein the recording layer has a thickness of at most 10 nm between the recording groove parts in the unrecorded state.

(7) The optical recording medium according to any one of the above aspects (1) to (6), wherein the recording/reproducing light has the wavelength λ of at least 350 nm and at most 450 nm.

(8) The optical recording medium according to any one of the above aspects (1) to (7), further comprising an interface layer provided between the recording layer and the cover layer to prevent interfusion of a material of the recording layer and a material of the cover layer.

(9) The optical recording medium according to the above aspect (8), wherein the interface layer has a thickness of at least 1 nm and at most 50 nm.

EFFECT OF THE INVENTION

The present invention provides an extremely high-density optical recording medium with good jitter characteristics.

Figure 1:
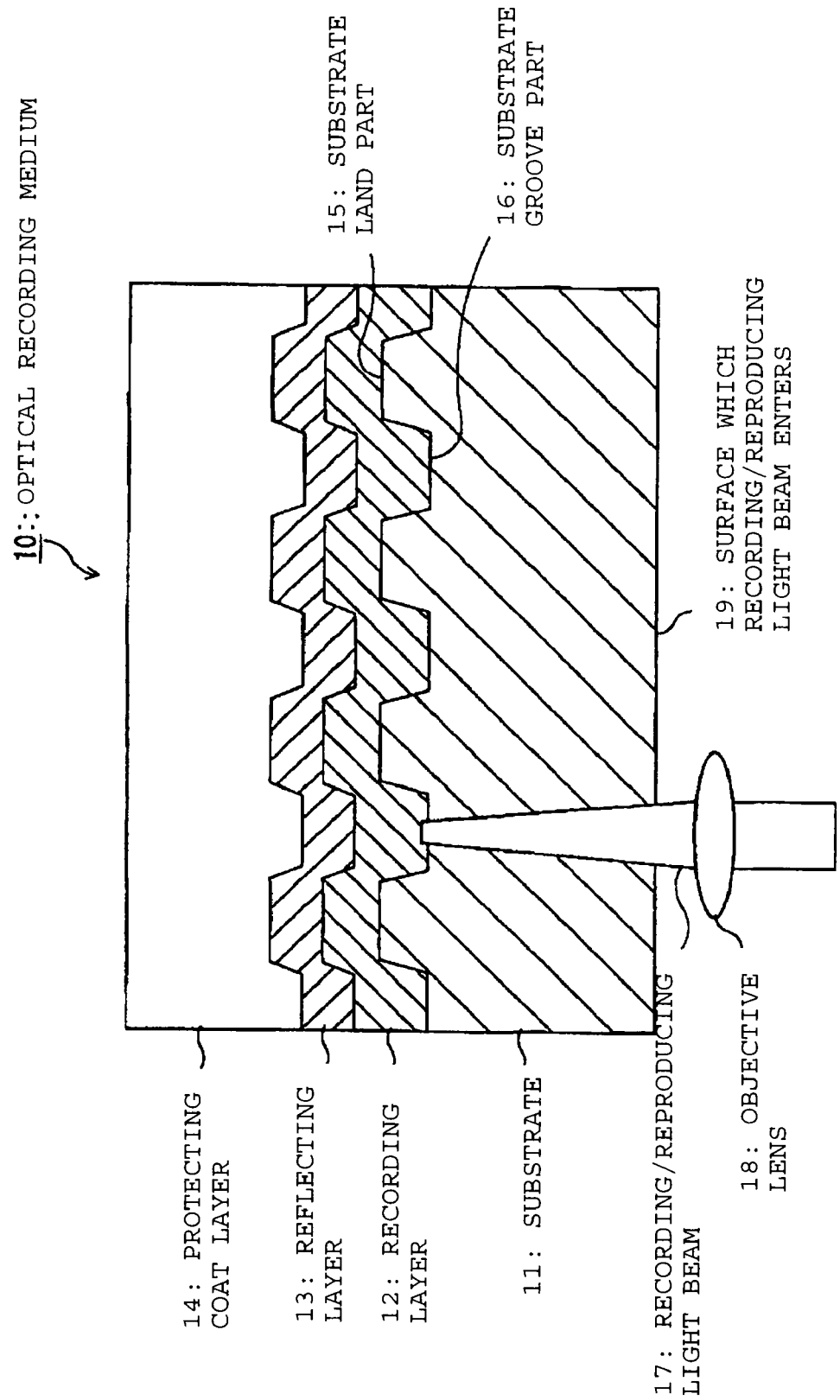
FIG. 1 is a drawing to illustrate a WORM medium (optical recording medium) with a recording layer comprising a dye as a main component, in a conventional configuration.

MEANS OF SYMBOLS 10, 20: optical recording medium
11, 21: substrate
12, 22: recording layer
13, 23: reflecting layer
14: protecting coat layer
15: substrate land part
16: substrate groove part
17, 27: recording/reproducing light beam
18, 28: objective lens
19, 29: surface which a recording/reproducing light beam enters
24: cover layer
25: cover layer land part
26: cover layer groove part
30: interlayer

BEST MODE FOR CARRYING OUT THE INVENTION

The present invention will be specifically described with reference to embodiments thereof. However, the present invention is by no means restricted to the following embodiments, and the present invention can be carried out in a variety of modification forms within the scope of the invention.

Figure 2:
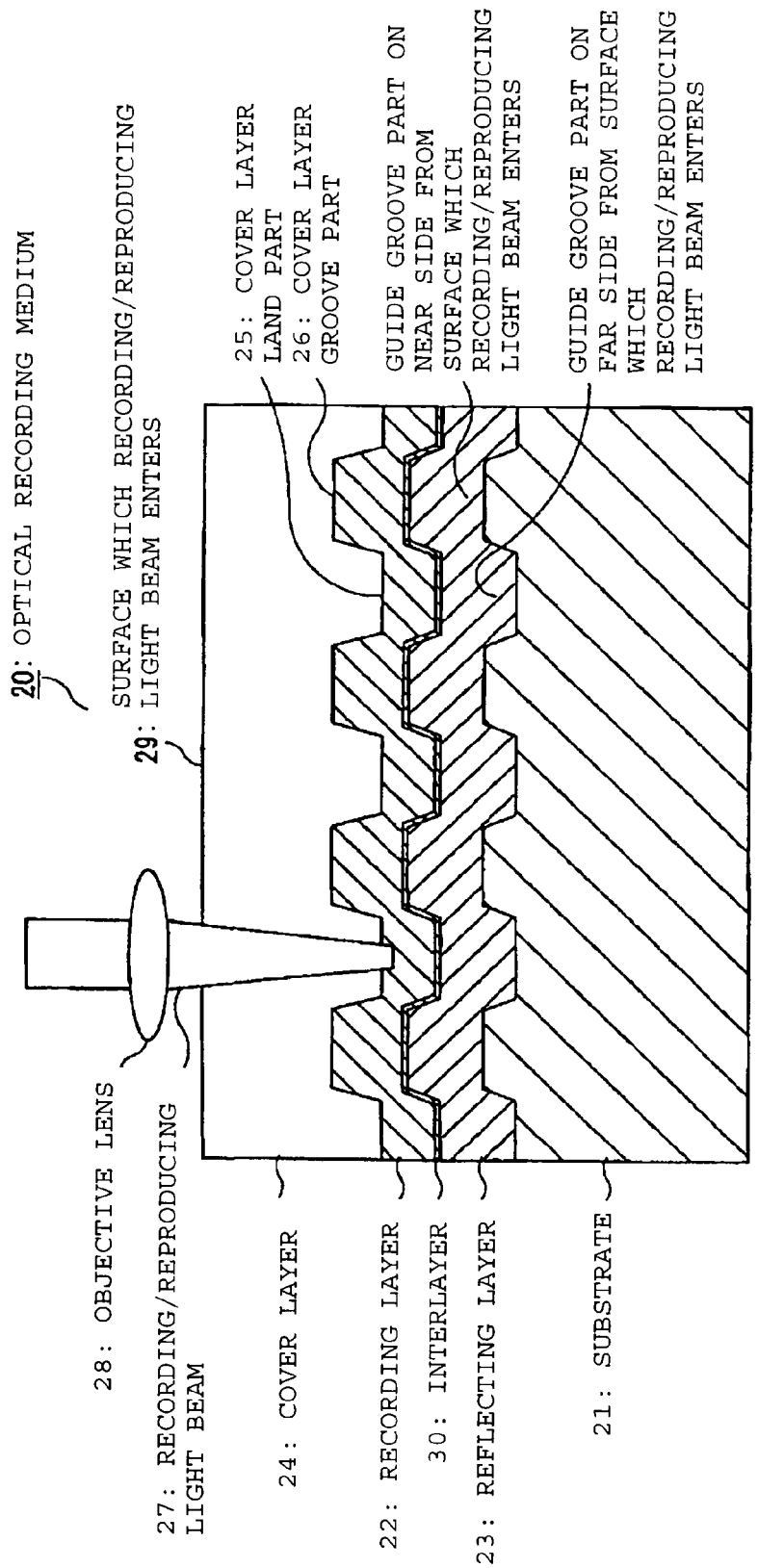
FIG. 2 is a drawing to illustrate a WORM medium (optical recording medium) of a film-surface-incidence configuration with a recording layer comprising a dye as a main component, to which an embodiment of the present invention is applied.

FIG. 2 is a drawing to illustrate a WORM medium (optical recording medium 20) of a film-surface-incidence configuration with a recording layer comprising a dye as a main component, to which an embodiment of the present invention is applied.

In the present embodiment, the medium has a structure in which a layer (reflecting layer 23) with a reflection function comprising at least Ag as a main component, an interlayer 30, a recording layer 22 with a light absorption function comprising a dye as a main component showing absorption for recording/reproducing light in an unrecorded state (before recording), and a cover layer 24 are stacked in order on a substrate 21 with a guide groove formed therein, and recording/reproduction is implemented in such a manner that a recording/reproducing light beam 27 focused through an objective lens 28 is guided from the cover layer 24 side. Namely, the medium has the "film-surface-incidence configuration" (which is also called a reverse stack).

The layer with the reflection function comprising Ag as a main component will be referred to simply as "reflecting layer 23" and the recording layer with the light absorption function comprising the dye as a main component, simply as "recording layer 22." The conventional configuration described with FIG. 1 will be referred to as the "substrate incidence configuration," as described above.

For introducing the recording/reproducing light beam 27 into the cover layer 24 in the film-surface-incidence configuration, an objective lens with a high NA (numerical aperture) approximately equal to NA (numerical aperture)=0.6 to 0.9 is normally used for high-density recording.

The wavelength λ of the recording/reproducing light is often selected from the wavelengths of from red to blue-violet (approximately from 350 nm to 600 nm). Furthermore, it is preferable to use the wavelength range of from 350 nm to 450 nm, for high-density recording, but the wavelength does not necessarily have to be limited to this range.

In the present embodiment, preferable recording is such that a recording groove part is defined as a guide groove part on the far side from an incidence surface of the recording/reproducing light beam 27 into the cover layer 24 in FIG. 2 (a surface 29 which the recording/reproducing light beam enters) (i.e., a guide groove part more distant from the surface which the recording/reproducing light beam enters) and that the intensity of reflected light from a recording pit part formed in the recording groove part becomes higher than the intensity of reflected light from the recording groove part in an unrecorded state (i.e., "Low to High" recording, which will be sometimes called "LtoH" recording). The principal mechanism of the recording is that the increase in the intensity of reflected light is attributed to a phase change of reflected light in the recording pit part. Namely, the recording is performed by making use of a change between optical path lengths of going and returning paths of reflected light in the recording groove part before and after recording.

In the optical recording medium 20 of the film-surface-incidence type, the guide groove part on the far side from the incidence surface of the recording/reproducing light beam 27 into the cover layer 24 (the surface 29 which the recording/reproducing light beam enters) (which corresponds to the groove part of the substrate 21) will be called a cover layer land part (in-groove) 25 and the guide land part on the near side to the surface 29 which the recording/reproducing light beam 27 enters (which corresponds to the land part of the substrate 21) will be called a cover layer groove part (on-groove) 26 (the terms "on-groove" and "in-groove" are based on Non-patent Document 3).

More specifically, the following means make it possible to realize preferred forms for the prevent invention.

(1) The groove is formed in such a depth that a difference φ between a phase of reflected light from the cover layer land part in an unrecorded state and a phase of reflected light from the cover layer groove part falls approximately in the range of from $\pi/2$ to $\pi$; the recording layer 22 is such a thin film that the film thickness thereof is smaller in the cover layer land part (in-groove) than the depth of the groove, and the recording layer 22 comprising the dye as a main component is provided as a very thin film having the film thickness of near zero in the cover layer groove part (on-groove). The recording/reproducing light beam is applied from the cover layer side to the cover layer land part to cause alteration of the recording layer, thereby forming a recording pit based on the increase in intensity of reflected light mainly due to the phase change. In the film-surface-incidence structure, the performance of the coating type dye medium is significantly improved, when compared with the conventional on-groove or "HtoL" recording. It also becomes feasible to achieve recording in a high track pitch density (e.g., from 0.2 μm to 0.4 μm) with small crosstalk. It also becomes easier to form the groove at such a high track pitch.

(2) The recording layer 22 is made using the main component of the dye with a relatively low refractive index (e.g., the refractive index from 1.3 to 1.9) and a relatively high extinction coefficient (e.g., the extinction coefficient from 0.3 to 1) in the unrecorded state, and recording is performed to form a recording pit part with a decreased refractive index on the incidence side of the recording/reproducing light to a reflecting surface. This causes a phase change to make an optical path length of the recording/reproducing light having passed the recording pit part, shorter than that before recording. Namely, the recording causes such a change that the depth of the recording groove part becomes optically shallower, so as to increase the intensity of reflected light.

The refractive index can be smaller than those of the recording media using the conventional dye recording layer, degrees of freedom increase for relationship between the main absorption band and the wavelength of the recording/reproducing light, and a range of choice is expanded, particularly, for the dye suitable for recording near the recording/reproducing light wavelength of 400 nm.

(3) The decrease in the refractive index in the recording pit part may be realized by making use of formation of a cavity inside the recording layer 22 or in an interface part thereof. It is also preferable to additionally use expansion deformation of the recording layer 22 toward the cover layer 24, and a soft deformation-promoting layer of an adhesive or the like with the glass transition point equal to or below room temperature is formed at least on the recording layer 22 side of the cover layer 24, so as to promote the deformation. This results in aligning directions of the phase changes to increase the intensity of reflected light by recording (or nullifying distortion of a recording signal waveform). In addition, a large phase change amount (amplitude of a recording signal) can be achieved even with a relatively small change of refractive index. Furthermore, it is also possible to additionally use an increase in the intensity of reflected light based on a decrease in the extinction coefficient of the recording layer and a change in reflectance caused in a planar state.

As described above, the optical recording medium can be realized as one comprising a substrate with a guide groove formed therein, and comprising at least a layer with a light reflection function, an interlayer, a recording layer comprising a dye as a main component with a light absorption function for a wavelength of recording/reproducing light in an unrecorded state, and a cover layer where the recording/reproducing light is incident to the recording layer, in the order mentioned, on the substrate, wherein, when a recording groove part is a guide groove part on the far side from a surface where a recording/reproducing light beam resulting from focusing of the recording/reproducing light is incident to the cover layer, an intensity of reflected light from a recording pit part formed in the recording groove part is higher than an intensity of reflected light from an unrecorded recording part in the recording groove part. Namely, the optical recording medium has a feature of obtaining the polarity of an "LtoH" recording signal with a high modulation index and without distortion from the recording pit part.

The optical recording medium using such a recording method is as described in the specification of WO 2006/009107 by the inventors, and the essentials thereof will be summarized below.

The optical properties of the recording layer in the unrecorded state (before recording) at the wavelength λ of the recording/reproducing light will be represented by the complex index of refraction $n_d^* = n_d - i \cdot k_d$. The real part $n_d$ is called the refractive index and the imaginary part $k_d$ the extinction coefficient. It is assumed that in a recording pit part after recording, $n_d$ changes to $n_d' = n_d - \delta n_d$ and $k_d$ changes to $k_d' = k_d - \delta k_d$.

Furthermore, the below explains a distinction between two terms of reflectance and intensity of reflected light used in the present specification.

The reflectance is a rate of light intensity of reflected energy to light intensity of incident energy in reflection of light occurring between two types of substances with different optical properties in a planar state. Even if the recording layer is planar, a change in the optical properties will result in a change in the reflectance.

On the other hand, the intensity of reflected light is an intensity of light returning onto a detector when a surface of the recording medium is read through the objective lens with a focused recording/reproducing light beam.

In a ROM medium, a pit part and an unrecorded part (a region around a pit) are covered by the same reflecting layer and thus the reflectance of the reflecting layer is equal in the pit part and in the unrecorded part. On the other hand, there is a phase-difference between reflected light from the pit part and reflected light from the unrecorded part, so as to induce interference, and the intensity of reflected light from the recording pit part appears varied (normally appears lowered) by the interference effect.

This interference effect is caused by interference between the reflected light from the recording pit part and the reflected light from the surrounding part due to the phase-difference between them in a case where the recording pit is locally formed and where the recording pit part and the unrecorded part around it are included inside the diameter of the recording/reproducing light beam.

On the other hand, in a recordable medium in which some optical change occurs in the recording pit part, a reflectance change occurs because of a refractive index change of the recording layer itself even in a planar state without unevenness. This is called "reflectance change caused in the planar state" in the present embodiment. In other words, the "reflectance change caused in the planar state" is a change in reflectance caused in the recording layer, depending upon whether the refractive index of the entire recording layer plane is the refractive index before recording or the refractive index after recording, and is a change in intensity of reflected light caused without consideration to the interference between reflected light from the recording pit and reflected light from the surrounding region.

On the other hand, in a case where an optical change of the recording layer occurs in a local pit part and where the phase of reflected light from the recording pit part is different from the phase of reflected light from the surrounding region thereof, two-dimensional interference occurs between the reflected light beams whereupon the intensity of reflected light appears locally varied in the surrounding region of the recording pit.

In the present embodiment, as described above, the change in intensity of reflected light without consideration to the two-dimensional interference between reflected light beams with different phases is defined as "reflected light intensity change caused in the planar state" or "reflected light intensity change in the planar state" and the change in intensity of reflected light with consideration to the two-dimensional interference between reflected light beams with different phases from the recording pit and the surrounding region thereof is defined as "(local) reflected light intensity change caused by phase-difference" or "reflected light intensity change by phase-difference"; the two changes are handled as distinguished from each other as defined above.

In general, the refractive index change of the recording layer 22 itself has to be very large in order to achieve a sufficient reflected light intensity change or sufficient amplitude of a recording signal (or optical contrast) by the "reflected light intensity change by phase-difference." For example, with CD-R and DVD-R, the real part of the complex refractive index of the dye recording layer is required to be from 2.5 to 3.0 before recording and approximately from 1 to 1.5 after recording. The imaginary part $k_d$ in the complex index of refraction before recording of the dye recording layer was believed to be preferably smaller than about 0.1, in order to achieve a ROM-compatible high reflectance in the unrecorded state.

The film thickness of the recording layer 22 is desirably a little thick, from 50 nm to 100 nm. The reason is that if the thickness is smaller than that range, most of light passes through the recording layer 22 and optical absorption cannot occur in a level necessary for a sufficient reflected light intensity change and formation of a pit. With such a thick dye recording layer, the local phase change due to deformation in the pit part is no more than supplementary use.

Incidentally, the above-mentioned ROM medium involves no local refractive index change in the recording pit part and it is believed that only the "reflected light intensity change by phase-difference" is detected. For achieving a good recording quality, where the reflected light intensity change in the recording pit part occurs as a mixture of the above-described two types of reflected light intensity changes, it is preferable that the two reinforce each other. That the two types of reflected light intensity changes reinforce each other means that the directions of the two changes in reflected light intensity, i.e., increases or decreases in reflected light intensity are aligned.

The decrease in the refractive index of the recording layer as described above leads to a decrease in reflectance and, therefore, a decrease in intensity of reflected light, in the "reflected light intensity change in the planar state." This refractive index change can be 1 or more in the conventional CD-R and DVD-R as described above, and thus the reflectance decrease by the "reflected light intensity change in the planar state" amounts to a considerable part of amplitude of a recording signal. Therefore, the reflectance is basically lowered by recording.

It can be said that various studies have been conducted so that the direction of the "reflected light intensity change by phase-difference" in the recording pit part supplementarily used can make a contribution to the decrease in reflectance.

On the other hand, a decrease in the extinction coefficient by decomposition of the dye in the recording layer leads to an increase in reflectance and rather lowers the amplitude of the signal, and therefore it is desirable to keep the change in the extinction coefficient small. Furthermore, it is desirable to keep small the extinction coefficient of the recording layer before recording, in order to achieve a high reflectance before recording equivalent to that of the ROM medium. Therefore, the extinction coefficient is normally designed to be small, at most 0.3, preferably, at most about 0.2.

A reflection reference plane will be defined below. The reflection reference plane is defined along a recording-layer-side interface (surface) of the interlayer as a main reflecting surface. The main reflecting surface refers to a reflecting interface with the highest rate of contribution to reproducing reflected light.

In FIG. 2 showing the optical recording medium 20 to which the present embodiment is applied, the main reflecting surface is present at the interface between the recording layer 22 and the interlayer 30. The reason is that the recording layer 22 as a target is relatively thin in the optical recording medium 20 to which the present embodiment is applied and the absorptance thereof is low. Therefore, most of optical energy passes simply through the recording layer 22 and can reach the border between the recording layer 22 and the interlayer 30.

There are other interfaces that can cause reflection, and the intensity of reflected light of reproducing light is determined by total contribution of reflected light intensities and phases from the respective interfaces. Since major contribution is made by reflection on the main reflecting surface in the optical recording medium 20 to which the present embodiment is applied, it is sufficient to take account of only the intensity and phase of light reflected on the main reflecting surface. For this reason, the main reflecting surface is defined as the reflection reference plane.

In the present embodiment, first, it is preferable to form a pit (mark) in the cover layer land part 25 in FIG. 2. It is chiefly because use is made of the recording layer 22 formed by the spin coat method (coating method) permitting easy production thereof. Namely, when the coating method is applied, it follows that the thickness of the recording layer in the cover layer land part (substrate groove part) 25 becomes larger than the thickness of the recording layer in the cover layer groove part (substrate land part) 26, but the thickness is not so large as to achieve a sufficient reflected light intensity change by the "reflected light intensity change in the planar state." A large reflected light intensity change (high modulation index) is achieved in the pit part formed in the cover layer land part 25 even with a relatively small film thickness of the recording layer and a small refractive index change of the recording itself, mainly by the "reflected light intensity change taking account of interference."

In the present embodiment, a change in the phase of reflected light in the recording pit part preferably causes such a change that a level difference between the cover layer land part 25 and the cover layer groove part 26 composed of the reflection reference plane in FIG. 2 appears optically shallower after recording than before recording. In this case, for stabilization of tracking servo, a phase change is first made in a recording pit in such a manner that no inversion of a push-pull signal occurs and that the intensity of reflected light after recording becomes higher than that before recording.

The layer structure of the optical recording medium 20 in the film-surface-incidence configuration to which the present embodiment shown in FIG. 2 is applied will be described with focus on the phase of light reflected on the reflection reference plane, with reference to FIG. 3(a) and FIG. 3(b) as an example in which recording is is performed in the cover layer land part 25 shown in FIG. 2.

Each of FIG. 3(a) and FIG. 3(b) is a drawing to illustrate the layer structure of the film surface incidence type medium (optical recording medium 20) and a phase-difference of reflected light in recording in the portion of the cover layer land part 25. Namely, FIG. 3(a) and FIG. 3(b) are the drawings to illustrate the phase-difference of reflected light of the recording/reproducing light beam 27 incident from the incidence surface 29 side of the cover layer 24 in the film surface incidence configuration, in the optical recording medium 20 of the film surface incidence configuration in FIG. 2. In FIGS. 3(a) and 3(b), elements common to those in FIG. 2 are denoted by the same reference symbols. It is also noted that some of the elements shown in FIG. 2 are depicted without their reference symbol in FIGS. 3(a) and 3(b).

Specifically, FIG. 3(a) is a sectional view of the medium before recording and FIG. 3(b) a sectional view including a recording pit after recording. In the description hereinafter, a groove or land part in which a recording pit is formed will be referred to as a "recording groove part," and a region between recording groove parts as a "recording land part." Namely, in FIGS. 3(a) and 3(b) showing a preferred form of the present invention, the cover layer land part 25 is a "recording groove part" and the cover layer groove part 26 is a "recording land part."

First, a phase reference plane is defined by A-A', for determining a phase-difference between reflected light in the recording groove part and reflected light in the recording land part. In FIG. 3(a) showing an unrecorded state, A-A' corresponds to an interface between the recording layer 22 and the cover layer 24 in the recording land part. On the other hand, in FIG. 3(b) showing a recorded state, A-A' corresponds to the interface between the recording layer 22 and the cover layer 24 in the recording land part. Before the plane A-A' (on the incidence side), no optical difference is made by the optical path. As shown in FIG. 3(a), a reflection reference plane in the recording groove part before recording is defined by B-B' and a bottom surface of the cover layer 24 in the recording groove part before recording (the interface between the recording layer 22 and the cover layer 24) is defined by C-C'.

Let $d_G$ be the thickness of the recording layer in the recording groove part before recording, $d_L$ be the thickness of the recording layer in the recording land part, $d_{GL}$ be a level difference between the recording groove part and the recording land part on the reflection reference plane, and $d_{GLS}$ be a level difference of the recording land part on the surface of the substrate 21. Although the thicknesses of the reflecting layer 23 and the interlayer 30 depend upon how they are coated in the recording groove part and in the recording land part, each of the reflecting layer 23 and the interlayer 30 usually has substantially the same film thickness throughout the recording groove part and the recording land part. Since the level difference on the surface of the substrate 21 is reflected as it is, $d_{GL}=d_{GLS}$.

Let $n_s$ be the refractive index of the substrate 21 and $n_c$ be the refractive index of the cover layer 24.

When a recording pit is formed, the following change is generally caused. In a recording pit part 25p, the refractive index of the recording layer 22 changes from $n_d$ to $n_d'=n_d-\delta n_d$.

In the recording pit part 25p, interfusion occurs between a material of the recording layer 22 and a material of the cover layer 24 at the incidence-side interface of the recording layer 22 to form a mixed layer.

Furthermore, the recording layer 22 undergoes a volume change to move the position of the reflection reference plane (the interface between the recording layer 22 and the interlayer 30). It is normally the case that formation of a mixed layer between a material of the substrate 21 as an organic substance and a material of the reflecting layer 23 as a metal is negligible.

In the description hereinafter, a relation between two layers will be sometimes expressed by describing both names of the two layers in succession with "/" in between. For example, a "recording layer/interlayer interface" refers to an interface between a recording layer and an interlayer.

It is then assumed that interfusion between the material of the recording layer 22 and the material of the cover layer 24 occurs between the recording layer 22 and the cover layer 24 (FIG. 2) to form a mixed layer 25m in a thickness $d_{mix}$. The refractive index of the mixed layer 25m is defined as $n_c'=n_c-\delta n_c$ (FIG. 3(b)).

On this occasion, the recording layer 22/cover layer 24 interface moves by $d_{bmp}$ after recording, with respect to C-C'. The positive direction of $d_{bmp}$ is set along a direction of movement into the interior of the recording layer 22, as shown in FIG. 3(b). Conversely, when $d_{bmp}$ is negative, it means that the recording layer 22 expands over the plane C-C'. If an interface layer is provided to prevent interfusion of the two materials between the recording layer 22 and the cover layer 24, the thickness $d_{mix}$ can be equal to 0. However, a volume change of the recording layer 22 can cause deformation of $d_{bmp}$. When no dye interfusion occurs, influence of a refractive index change due to the $d_{bmp}$ deformation of the substrate 21 or the cover layer 24 is considered to be negligibly small.

On the other hand, let $d_{pit}$ be a distance of movement of the reflection reference plane in the recording groove part, with respect to the position B-B' of the reflection reference plane before recording. The movement distance $d_{pit}$ is positive in a direction of constriction of the recording layer 22 (or a direction of movement of the reflection reference plane into the interior of the recording layer 22) as shown in FIG. 3(b). Conversely, when $d_{pit}$ is negative, it means that the recording layer 22 expands over the plane B-B'. The thickness $d_{Ga}$ of the recording layer 22 after recording is represented by Equation (1) below.

$$d_{Ga}=d_G-d_{pit}-d_{bmp} \quad \text{Eq (1)}$$

It is noted that none of $d_{GL}$, $d_G$, $d_L$, $d_{mix}$, $n_d$, $n_c$, $n_s$, and $d_{Ga}$ takes any negative value from their definition and physical properties.

The well-known methods were applied to modeling of such a recording pit and a method of estimation of phases described below (Non-patent Document 1).

Now, phase-differences before and after recording between reproducing light beams (reflected light) in the recording groove part and in the recording land part on the phase reference plane A-A' are obtained. Let φb be the phase-difference between reflected light beams in the recording groove part and in the recording land part before recording, φa be the phase-difference between reflected light beams in the recording pit part 25p and in the recording land part after recording, and φ be a generic name thereof. These phase-differences φa and φb both are defined by Equation (2) and Equation (3) below.

$$\varphi = \varphi b \text{ or } \varphi a \quad \text{Eq (2)}$$
$$= \text{(phase of reflected light in recording land part)} -$$
$$\text{(phase in recording groove part (including the pit}$$
$$\text{part after recording))}$$

$$\varphi = \varphi b \text{ or } \varphi a \quad \text{Eq (3)}$$
$$= (2\Pi/\lambda) \cdot 2 \cdot \{\text{(optical path length of recording land part)} -$$
$$\text{(optical path length of recording groove part}$$
$$\text{(including the pit part after recording))}\}$$

The reason why the factor 2 is multiplied in Eq (3) is that consideration is given to the optical path length of going and returning paths.

In FIGS. 3(a) and 3(b), Equations (4) and (5) below hold.

$$\varphi b = (2\Pi/\lambda) \cdot 2 \cdot \{n_d \cdot d_L - [n_d \cdot d_G + n_c \cdot (d_L + d_{GL} - d_G)]\} \quad \text{Eq (4)}$$
$$= (4\Pi/\lambda) \cdot \{(n_c - n_d) \cdot (d_G - d_L) - n_c \cdot d_{GL}\}$$

$$\varphi a = (2\Pi/\lambda) \cdot 2 \cdot \{(n_d \cdot d_L - [n_c \cdot (d_L + d_{GL} - d_G + d_{bmp} - d_{mix}) + \quad \text{Eq (5)}$$
$$(n_d - \delta n_d) \cdot (d_G - d_{pit} - d_{bmp}) + (n_c - \delta n_c) \cdot d_{mix}]\}$$
$$= \varphi b + \Delta \varphi$$

In the above equation, Δφ is represented by Eq (6) below.

$$\Delta\varphi=(4\pi/\lambda)\{(n_d-n_c)\cdot d_{bmp}+n_d\cdot d_{pit}+\delta n_c\cdot d_{mix}+\delta n_d\cdot(d_G-d_{pit}-d_{bmp})\} \quad \text{Eq (6)}$$

Since the recording groove part is located deeper than the recording land part when viewed from the incidence side, φb<0.

Δφ is a phase change in the pit part caused by recording.

A modulation index m of a signal caused by Δφ is given as follows.

$$m \propto 1-\cos(\Delta\varphi)=\sin^2(\Delta\varphi/2) \quad \text{Eq (7)}$$
$$\approx (\Delta\varphi/2)^2 \quad \text{(8)}$$

The rightmost side (8) is an approximation where Δφ is small.

The modulation index is large if |Δφ| is large. However, the phase change |Δφ| by recording is usually between 0 and π and is normally considered to be at most about π/2. In fact, there is no report of such large phase change in the conventional dye recording layers including the conventional CD-R and DVD-R.

In the blue wavelength region, as described above, the phase change tends to be even smaller from the general characteristics of the dye. On the other hand, a change of |Δφ| over π can invert compulsion of push-pull before and after recording and can cause a too large change of a push-pull signal, and is thus not preferred in terms of maintenance of stability of tracking servo.

Figure 4:
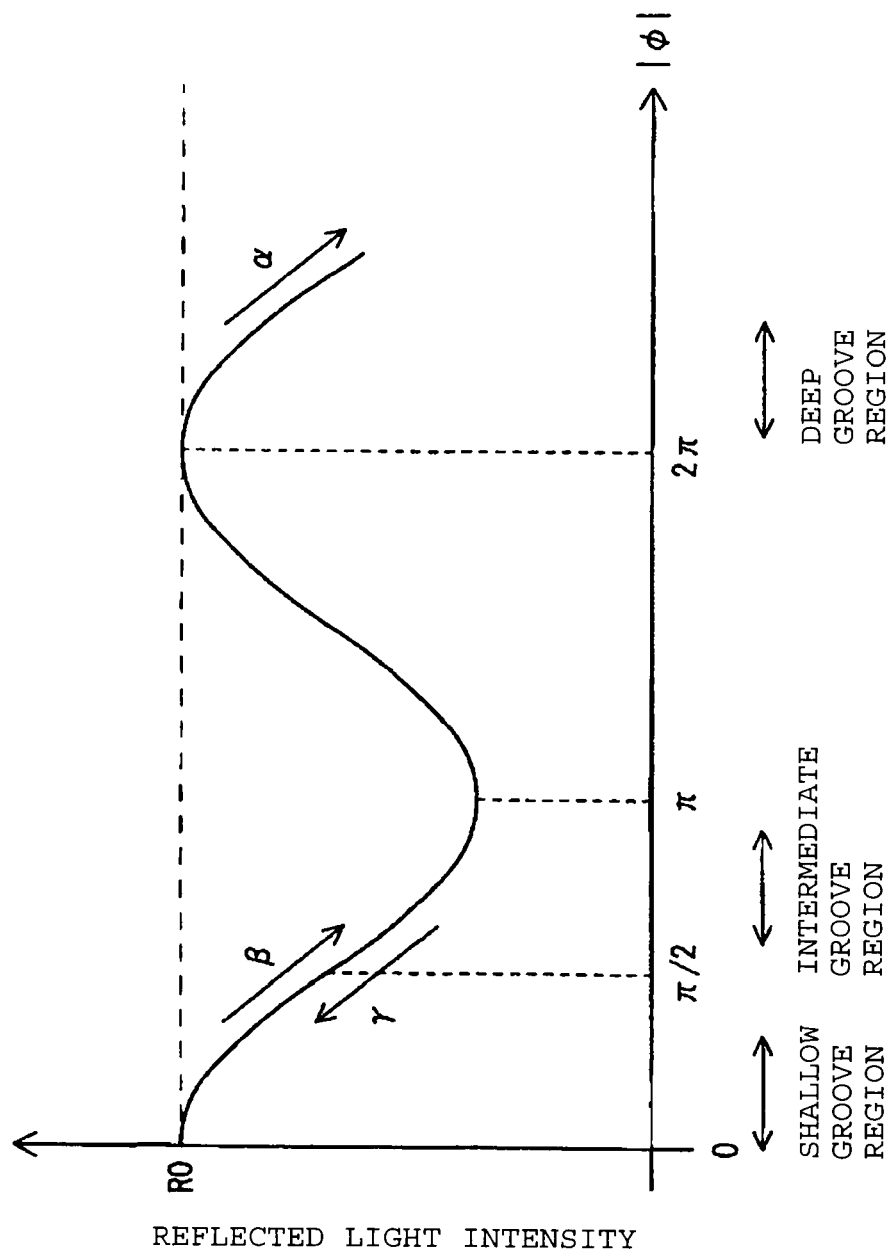
FIG. 4 is a drawing to illustrate a relation between reflected light intensity and phase-difference between a recording groove part and a recording land part.

FIG. 4 is a drawing to illustrate a relation between the phase-difference between phases in the recording groove part and in the recording land part and the intensity of reflected light.

FIG. 4 shows the relation between |φ| and the reflected light intensity in the recording groove part before and after recording. Influence of absorption of the recording layer 22 is ignored herein for simplicity. In the configuration of FIGS. 3(a) and 3(b), normally, φb<0; therefore, the case of Δφ<0 is a direction of increase of |φ| in FIG. 4. Namely, it is equivalent to multiplication of the horizontal axis in FIG. 4 by −1. Therefore, it is indicated that |φb| increases to |φa|.

When R0 stands for the reflectance of the recording groove part in the planar state ($d_{GL}=0$), increase in |φ| brings about the interference effect because of the phase-difference φb between reflected light beams from the recording groove part and the recording land part, so as to decrease the reflected light intensity. When the phase-difference |φ| becomes equal to π (half wavelength), the reflected light intensity becomes minimum. Furthermore, as |φ| increases over π, the reflected light intensity changes to increase and comes to have a maximum at |φ|=2π.

The intensity of the push-pull signal becomes maximum at the phase-difference |φ| of π/2, and minimum at π to invert its polarity. Thereafter, it again increases and decreases, and becomes minimum at 2π to again invert the polarity. The above relation is exactly the same as the relation between the depth of the pit part (equivalent to $d_{GL}$) and reflectance in the phase-pit ROM medium (Non-patent Document 5).

The below will describe the push-pull signal.

Figure 5:
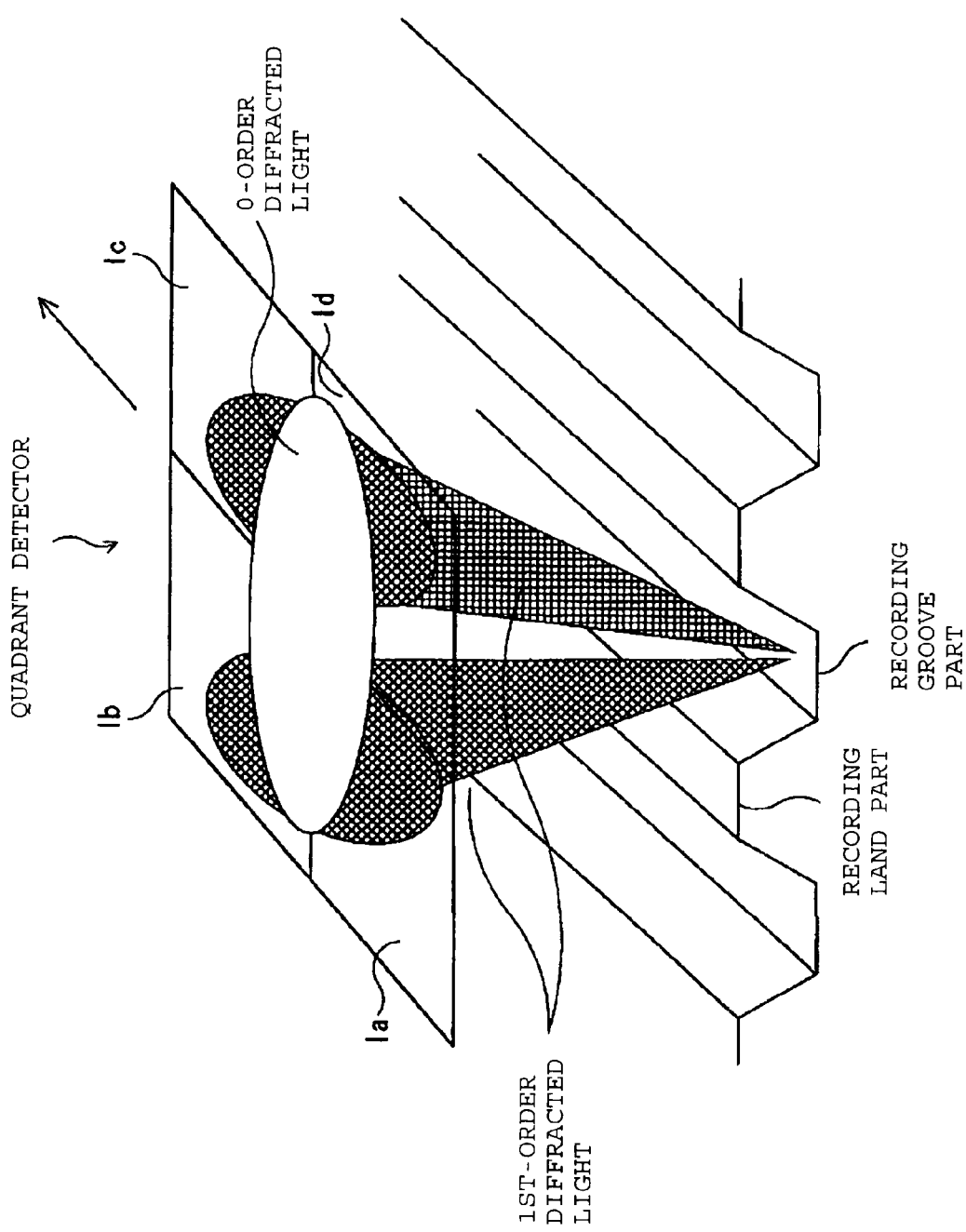
FIG. 5 is a drawing to illustrate a configuration of a quadrant detector which detects a recording signal (sum signal) and a push-pull signal (difference signal).

FIG. 5 is a drawing for explaining a configuration of a quadrant detector for detecting a recording signal (sum signal) and a push-pull signal (difference signal).

The quadrant detector consists of four independent photo-detectors and outputs of the respective photodetectors are denoted by Ia, Ib, Ic, and Id. The quadrant detector receives zero-order diffracted light and first-order diffracted light from the recording groove part and the recording land part in FIG. 5 and converts them into electric signals. Mathematical operation outputs represented by Equations (9) and (10) below are obtained from the signals from the quadrant detector.

$$I\text{sum}=(Ia+Ib+Ic+Id) \quad \text{Eq (9)}$$

$$IPP=(Ia+Ib)-(Ic+Id) \quad \text{Eq (10)}$$

Figure 6:
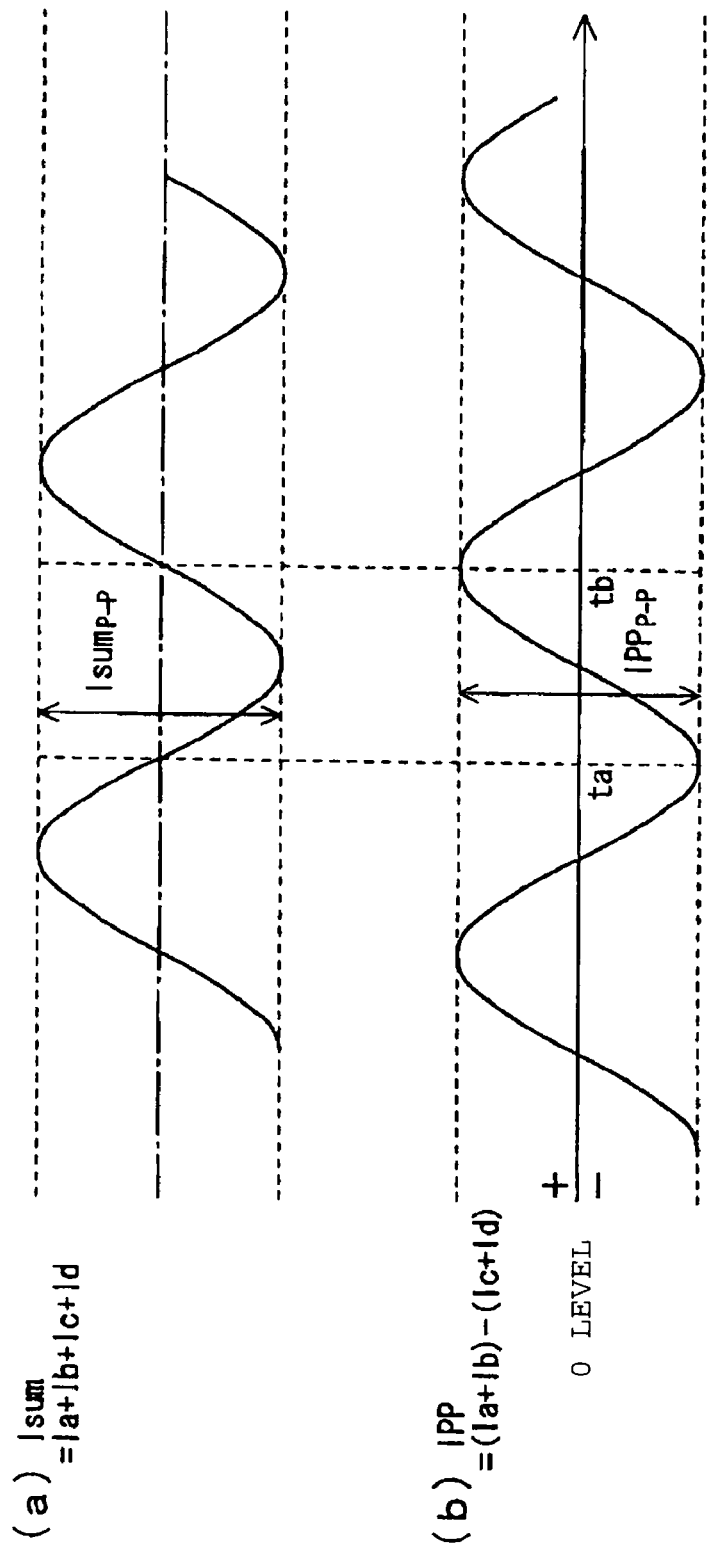
FIG. 6(a) and FIG. 6(b) are drawings each of which schematically shows a signal detected after an output signal obtained across a plurality of recording grooves and lands, is passed through a low-pass filter (cutoff frequency of about 30 kHz).

FIGS. 6(a) and 6(b) are drawings showing signals actually detected after output signals obtained across a plurality of groove parts and land parts are made to pass through a low-pass filter (cutoff frequency: about 30 kHz).

In FIGS. 6(a) and 6(b), $I\text{sum}_{p-p}$ represents a peak-to-peak signal amplitude of the Isum signal and $IPP_{p-p}$ a peak-to-peak signal amplitude of the push-pull signal. The push-pull signal intensity refers to $IPP_{p-p}$ and is distinguished from the push-pull signal itself (IPP).

The tracking servo is implemented by feedback servo, using the push-pull signal (IPP) of FIG. 6(b) as an error signal.

In FIG. 6(b), for example, when a zero cross point where the polarity of the IPP signal changes from + to − corresponds to a center of a recording groove part and when a zero cross point where the polarity changes from − to + corresponds to a recording land part, the inversion of polarity of push-pull means that this sign change becomes reverse. When signs become reverse, the following inconvenience takes place: while servo is intended to be effected on the recording groove part (i.e., while a focused beam spot is intended to impinge on the recording groove part), servo is actually effected on the recording land part to the contrary.

The Isum signal obtained with servo being effected on the recording groove part is a recording signal and in the present embodiment it shows a change of increase after recording.

A mathematical operation output represented by Eq (11) below is referred to herein as a normalized push-pull signal intensity ($IPP_{actual}$)

$$IPP_{actual} = [\{(Ia + Ib)(t) - (Ic + Id)(t)\} / \{(Ia + Ib)(t) + (Ic + Id)(t)\}]_{p-p} \quad \text{Eq (11)}$$
$$= \{IPP(tb) / Isum(tb)\} - \{IPP(ta) / Isum(ta)\}$$

(where ta is a time at minimum IPP and tb a time at maximum IPP.)

The normalized push-pull signal being a signal calculated from values of Isum and IPP is often used as a push-pull signal for tracking servo by optical recording/reproducing apparatus in practice.

The relation between phase-difference and reflected light intensity as shown in FIG. 4 is periodical as also seen from Eq (7) above. The change of |ϕ| through recording, i.e., |Δϕ| is usually smaller than about (π/2) in an optical recording medium with a recording layer comprising a dye as a main component. Conversely, in the present embodiment the change of |ϕ| by recording is determined to be at most π. For that, the thickness of the recording layer may be optionally made thinner if necessary.

When the phase (or optical path length) of reflected light from the recording groove part becomes smaller because of formation of a recording pit part 25p than that before recording with respect to the phase reference plane A-A' (or when the phase lags that before recording), i.e., when Δϕ>0, the optical distance (optical path length) of the reflection reference plane from the incidence side decreases and this means that the reflection reference plane becomes closer to the light source (or to the phase reference plane A-A'). Therefore, in FIGS. 3(a) and 3(b), it produces an effect equivalent to upward movement of the reflection reference plane of the recording groove part (decrease in $d_{GL}$) and as a result, the intensity of reflected light from the recording pit part 25p increases.

On the other hand, when the phase (or optical path length) of reflected light from the recording pit part 25p becomes larger than that before recording with respect to the phase reference plane A-A' (or when the phase lags that before recording), i.e., when Δϕ<0, the optical distance (optical path length) of the reflection reference plane from the incidence side increases and it means that the reflection reference plane becomes more distant from the light source (or from the phase reference plane A-A'). In FIGS. 3(a) and 3(b), it produces an effect equivalent to downward movement of the reflection reference plane of the recording groove part (increase in $d_{GL}$) and as a result, the intensity of reflected light from the recording pit part 25p decreases. Here the direction of change in the reflected light intensity, either decrease or increase in reflected light intensity of the recording pit part after recording, is referred to as the polarity of recording (signal).

Therefore, if the phase change of Δϕ>0 occurs in the recording pit part 25p, it is preferable to use the polarity of "LtoH" recording to increase the reflected light intensity by recording, in the recording groove part in FIGS. 3(a) and 3(b). On the other hand, if the phase change of Δϕ<0 occurs, it is preferable to use the polarity of "HtoL" recording in the recording groove part in FIGS. 3(a) and 3(b).

Preferred Embodiment of Sign of Phase Change Δϕ and Polarity of Recording

In the recording pit part 25p, optically, a phase change due to a refractive index change or deformation of the recording layer 22 (which contributes to a change in reflected light intensity with consideration to the phase-difference) can occur simultaneously with a change in reflected light intensity in the planar state due to a refractive index change (i.e., a change in reflected light intensity without consideration to the phase-difference), and directions of these changes are preferably aligned with each other. Namely, the individual reflected light intensity changes are preferably aligned with each other, in order to keep the polarity of the recording signal constant irrespective of recording power and, lengths and sizes of recording pits.

Here, in a case where a cavity is easily made in the recording layer or at an interface adjacent thereto, the refractive index in the cavity is considered to be $n_d'=1$ and, with comprehensive consideration to the decrease in the refractive index and others, it is preferable to adopt the phase change of Δϕ>0, i.e., the polarity of "LtoH" recording in the recording medium of FIGS. 3(a) and 3(b).

For aligning the directions of the respective phase changes with each other, it is preferable to make each phase change easy to control.

It is also preferable to set $d_{mix}=0$, for example, by providing an interface layer at the incidence-side interface of the recording layer. The reason is that a phase-difference change by $d_{mix}$ can not be so large and is thus hard to use positively, and it is difficult to control the thickness of the layer. Namely, it is preferable to realize $d_{mix}=0$, for example, by providing the interface layer at the incidence-side interface of the recording layer.

The deformation is preferably concentrated at one location and limited to one direction. It is because a good signal quality is obtained more easily by controlling a deformation portion at one location more accurately than by controlling a plurality of deformation portions.

Here, a relation between the phase change of Δϕ>0 and the push-pull signal is considered.

On the analogy of the conventional CD-R and DVD-R, in the case where the "HtoL" recording is performed in the cover layer groove part 26, a groove configuration for keeping the polarity of the push-pull signal uninverted is limited to such a deep groove level difference that an optical path length of going and returning paths is larger than one wavelength (which will be referred to as a "deep groove"), or such a groove level difference that a push-pull signal is barely produced (which will be referred to as a "shallow groove").

In the case of the deep groove, the phase change in the direction of arrow α in FIG. 4 is utilized so as to make the groove optically deeper. In this case, a groove depth at a start point of the arrow is preferably about 100 nm for the blue wavelength around 400 nm. As described previously, a narrow track pitch will easily give rise to defective transfer during molding and involve difficulties in mass production. Even if a desired groove shape is obtained, noise will be easily mixed in a signal because of fine surface roughness of groove walls. Furthermore, it is difficult to uniformly form the reflecting layer 23 on the bottom and the side walls of the groove and the reflecting layer 23 itself has poor adhesion to the groove walls, so as to readily cause deterioration such as delamination. If the "HtoL" recording is attempted to be performed using the phase change of Δφ>0 in accordance with the conventional method using the "deep groove" as described above, it will be difficult to decrease the track pitch.

On the other hand, in the case of the shallow groove, the phase change in the direction of arrow β is used in the slope in the interval of |φ|=0 to π in FIG. 4 to make the groove optically deeper, thereby achieving the "HtoL" recording. For achieving a certain level of push-pull signal intensity in an unrecorded state, the groove depth is about from 20 nm to 30 nm for the blue wavelength. When the recording layer 22 is formed in this state, the recording layer is likely to be formed in equal thickness in the recording groove part (cover layer groove part 26 in this case) and in the land part as in the planar state, and a recording pit is likely to project out from the recording groove part. Therefore, diffracted light from the recording pit leaks to an adjacent recording groove, so as to make crosstalk very large. Similarly, when the "HtoL" recording is attempted to be performed using the phase change of Δφ>0 in accordance with the conventional method, it is difficult to decrease the track pitch.

The inventors conducted research on the film-surface-incidence type dye media, particularly, on media with a coating type recording layer, in order to overcome the above problem. As a result, the inventors discovered that a preferred configuration for the film-surface-incidence type dye medium was one for obtaining a signal of polarity of "LtOH" recording using a phase change in a direction of arrow γ in FIG. 4, i.e., using an after-described "intermediate groove,", instead of the conventional polarity of the "HtoL" recording using the "deep groove."

Namely, an optical recording medium according to the present invention is an optical recording medium 20 in which recording/reproduction is performed by making recording/reproducing light incident from the cover layer 24 side, wherein when a recording groove part is a guide groove part on the far side from the surface where the recording/reproducing light beam 27 is incident to the cover layer 24 (the surface 29 which the recording/reproducing light beam 27 enters), the intensity of reflected light from the recording pit part formed in the recording groove part is higher than the intensity of reflected light in an unrecorded state of the recording groove part.

The conventional WORM media using the dye in the recording layer are characterized in that, after recording, they provide a recording signal equivalent to that from the ROM medium. For that, it is sufficient to ensure reproduction compatibility after recording, but it is not necessary to maintain a high reflected light intensity equivalent to that of the ROM medium before recording. The point is that the intensity of H-level reflected light after recording is within the range of reflected light intensity speculated in the ROM medium (which is often called simply the reflectance in the ROM medium). The polarity of the "LtoH" recording is exactly consistent with maintenance of reproduction compatibility with the ROM medium.

An important point in the present embodiment is that the aforementioned decrease in the refractive index of the recording layer, the decrease in the refractive index in the pit part due to formation of the cavity or the like, and the deformation inside or at the interface of the recording layer 22 all occur on the recording/reproducing light incidence side of the reflecting layer 23 being the main reflecting surface. Furthermore, it is preferable that neither of the interlayer/recording layer and reflecting layer/substrate interfaces should undergo deformation and interfusion in the recording pit part, in order to simplify the elements dominating the polarity of the recording signal and suppress distortion of the waveform of the recording signal.

In the film-surface-incidence configuration as shown in FIG. 2 and FIGS. 3(a) and 3(b), when the recording groove part is the guide groove part on the far side from the surface 29 which the recording/reproducing light beam 27 enters and when the recording principle by the same phase change as in the conventional configuration is applied, the recording of "LtoH" can be performed by making use of the phase change of Δφ>0.

For that, first, the phase change in the recording pit part 25p is desirably one based on formation of a portion with the refractive index lower than $n_d$ on the incident light side of the reflecting layer 23. Before recording, the reflectance is preferably maintained at least in the range of from 3% to 30%, in order to maintain stability of various servos.

The reflectance ($R_g$) of the recording groove part in the unrecorded state is one obtained by $R_g=R_{ref}(I_s/I_{ref})$ where only the reflecting layer with a known reflectance ($R_{ref}$) is formed in the same configuration as in the optical recording medium 20 shown in FIG. 2, $I_{ref}$ is an intensity of reflected light obtained by applying a focused light beam in focus with the recording groove part, and $I_s$ is an intensity of reflected light obtained similarly by applying the focused light beam to the recording groove part in the optical recording medium 20 shown in FIG. 2. Similarly, after recording, $R_L$ denotes a reflectance of the recording groove part corresponding to a low reflected light intensity $I_L$ between recording pits (space part) and $R_H$ a reflectance of the recording groove part corresponding to a high reflected light intensity $I_H$ at a recording pit (mark part), in the amplitude of the recording signal.

The description hereinbelow will follow general usage to quantify an intensity change of reflected light from the recording groove part, using the above-defined reflectances of the recording groove part.

Since the present embodiment makes use of the phase change by recording, transparency of the recording layer 22 itself is preferably high. When the recording layer 22 is made singly on a transparent polycarbonate substrate, the transmittance is preferably at least 40%, more preferably at least 50%, and still more preferably at least 60%. If the transmittance is too high, the recording layer cannot absorb a sufficient amount of recording light energy; therefore, the transmittance is preferably at most 95%, more preferably at most 90%.

On the other hand, whether such high transmittance is maintained can be approximately checked as follows: in a disk (in an unrecorded state) in the configuration of FIG. 2, the reflectance R0 is measured at a flat part (mirror surface part) in a planar state and the reflectance measured is normally at least 40%, preferably at least 50%, more preferably at least 70%, as a relative value based on a reflectance in a planar state of a disk having the same configuration except for the thickness of the recording layer of zero.

Preferred Embodiment of Recording Groove Depth $d_{GL}$ and, Thickness $d_G$ of Recording Layer in Recording Groove Part and Thickness $d_L$ of Recording Layer in Recording Land Part When the phase change of $\Delta\phi>0$ is used to perform the "LtoH" recording in the cover layer land part 25, the groove depth optically varies in the pit part and the push-pull signal strongly dependent on the groove depth becomes likely to vary before and after recording. A particular subject herein is a phase change to invert the polarity of the push-pull signal.

For performing the "LtoH" recording and keeping the polarity of the push-pull signal unchanged, it is preferable to utilize the phenomenon of decrease in optical groove depth by the phase change in the direction of arrow γ on the slope in the range of $0<|\phi b|$, $|\phi a|<\pi$ in FIG. 4. Namely, the recording is performed so as to cause the recording pit part 25$p$ to undergo such a change as to decrease the optical path length of the recording groove part to the reflection reference plane with respect to the phase-difference reference plane A-A' in FIGS. 3($a$) and 3($b$).

Further, when an optimal depth of the groove is considered by taking values of push-pull signal intensities before and after recording into account, in a case where the recording/reproducing light wavelength λ is the blue wavelength of from 350 to 450 nm, the groove depth $d_{GL}$ is normally at least 30 nm, preferably at least 35 nm. On the other hand, the groove depth $d_{GL}$ is normally at most 70 nm, preferably at most 65 nm, and more preferably at most 60 nm. A groove in such depth will be called an "intermediate groove." When compared with the case using the aforementioned "deep groove," it has the advantage that it becomes drastically easier to form the groove and to perform covering of the reflecting layer in the cover layer land part 25.

Namely, in the optical recording medium 20 to which the present embodiment is applied, it is preferable to form the recording layer 22 by coating and to satisfy a relation of (depth of groove)>(thickness of recording layer in recording groove part)>(thickness of recording layer on recording land part).

When the depth of the groove is from 30 nm to 70 nm, the thickness of the recording layer in the recording groove part is preferably at least 5 nm, more preferably at least 10 nm. A reason for it is that when the thickness of the recording layer in the recording groove part is at least 5 nm, the phase change can be made large and the recording layer can absorb optical energy necessary for formation of a recording pit. On the other hand, the thickness of the recording layer in the recording groove part is preferably less than 50 nm, more preferably at most 45 nm, and still more preferably at most 40 nm. For mainly using the phase change and reducing influence of "reflectance change in the planar state" due to the refractive index change, the recording layer 22 is desirably as thin as described above.

As in the case of the conventional CD-R and DVD-R, the recording layer with the main component of the dye having the high refractive index of from 2.5 to 3 in the unrecorded state can give rise to reduction in "reflectance in the planar state" if $n_d$ decreases by recording. When the "LtoH" recording is performed by the phase-difference change, reverse polarity is likely to occur.

Furthermore, when the recording layer 22 is thin, it is feasible to prevent deformation in the recording pit part from becoming too large and to prevent the recording pit part from projecting out to the recording land part.

In the present invention to form a recording pit in the cover layer land part, use of the "intermediate groove" depth as described above and the thickness of the recording layer in the substrate land part kept close to 0 to make the recording layer 22 thin and confine it in the recording groove in the "intermediate groove" depth are more preferable in a case where the formation of the cavity in the recording pit part and expansion deformation toward the cover layer are positively used as described above. In this respect, the present invention is also superior in the effect of suppressing crosstalk, to the case where recording is performed in the cover layer groove part and where the "HtoL" recording is performed by formation of the cavity.

Figure 3:
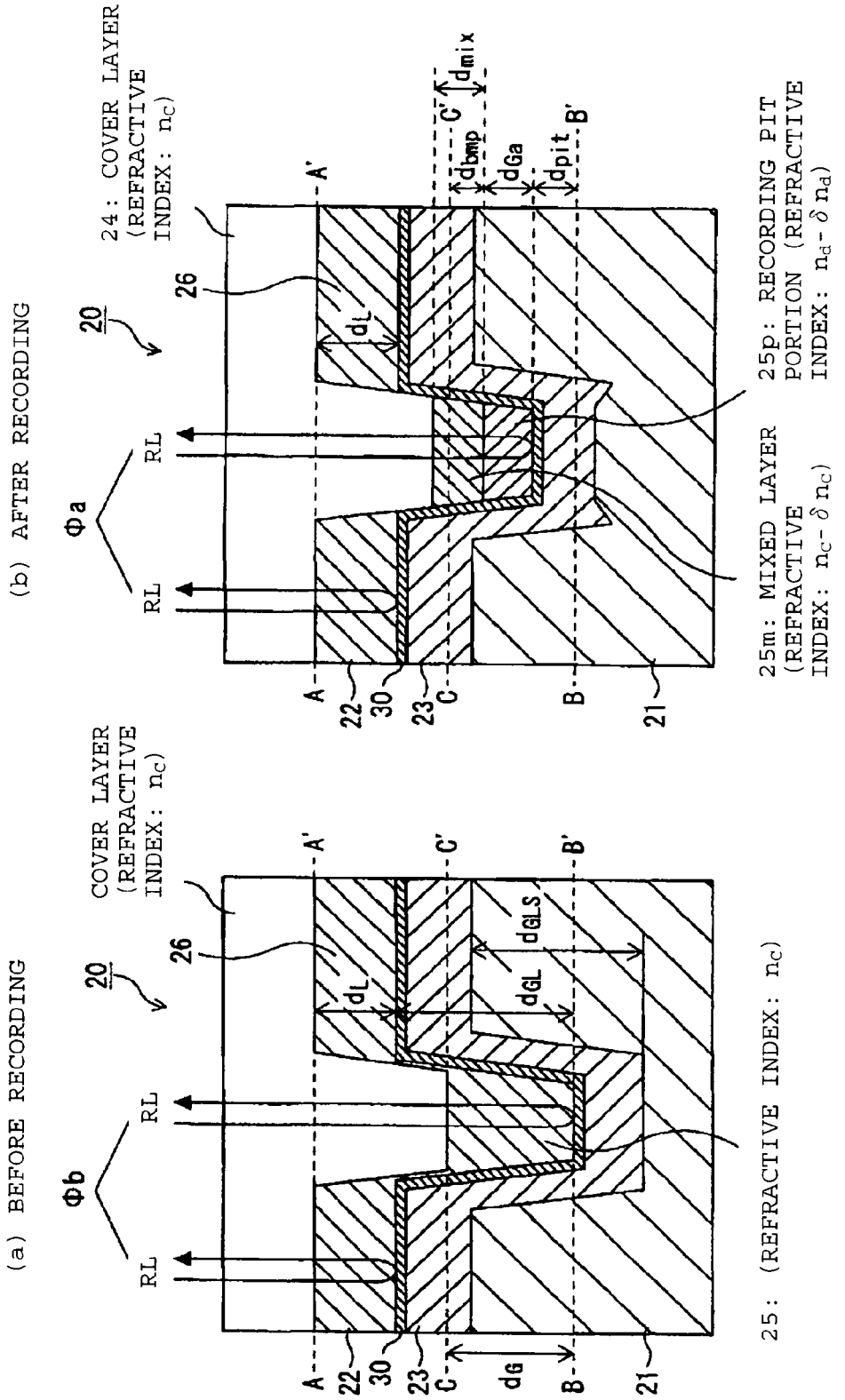
FIG. 3(a) and FIG. 3(b) are drawings each of which illustrates a layer configuration of the film-surface incidence type medium to which an embodiment of the present invention is applied, and a phase-difference in recording in a cover layer land part.

In this way, the present invention has the advantage that the recording pit is almost perfectly confined in the recording groove and leakage (crosstalk) of diffracted light from the recording pit part 25$p$ in FIGS. 3($a$) and 3($b$) to the adjacent recording groove is also very small. Namely, when the recording in the cover layer land part 25 is intended to be the "LtoH" recording, it is not merely an advantageous combination of the phase change of $\Delta\phi>0$ with the recording in the cover layer land part 25, but it also easily achieves a configuration more suitable for high-density recording by reduction in track pitch.

Preferred Embodiment of Recording Layer Refractive Indices, $n_d$, $n_c$, $\delta n_d$, and Deformation Amount $d_{bmp}$ For preventing phenomena of inversion of polarity of the recording signal ("HtoL" or "LtoH") and mixture thereof depending upon mark lengths (to obtain a differentiated waveform), it is effective to maintain a specific relation for a magnitude relation among the refractive indices of the recording layer before and after recording and the refractive index of the cover layer, and a combination of directions of deformation near the recording layer 22 and the cover layer 24.

For example, for promoting the deformation with the phase-difference arranged to achieve "LtoH" as polarity of the recording signal, it is desirable to produce a pressure of volume expansion due to thermal expansion, decomposition, or sublimation as thermal alternation of the recording layer 22. It is also preferable to provide an interface layer at the interface between the recording layer 22 and the cover layer 24, so that the pressure can be confined there so as not to leak to another layer. The interface layer is preferably one having a high gas barrier property and being easier to deform than the cover layer 24. Particularly, when a dye with strong sublimation nature is used as a main component, a volume expansion pressure is likely to be produced locally in the portion of the recording layer 22. At the same time, a cavity becomes easier to form, and even if the recording layer alone with the main component of the dye has a small refractive index change, the effect of formation of the cavity (whose internal $n_d$' can be deemed as 1) is added whereby a deemed refractive index change of the recording layer 22 is preferably increased. Namely, the cavity is preferably formed inside the recording layer 22 or at the interface thereof with the adjacent layer in order to increase the refractive index in phase, and the expansion of the recording layer 22 toward the cover layer 24 due to the pressure in the cavity is most preferable because it can most efficiently cause the change of $\Delta\phi>0$.

Preferred Embodiments of Specific Layer Configuration and Materials

In view of the circumstances that development of the blue wavelength lasers is under way, specific materials and embodiments of the layer configuration shown in FIG. 2 and FIGS. 3(a) and 3(b) will be described on the assumption that the wavelength λ of the recording/reproducing light beam 27 is around 405 nm.

Substrate

In the film-surface-incidence configuration, the substrate 21 may be any plastic, metal, glass, or other material with appropriate processability and rigidity. Unlike the conventional substrate incidence configuration, there are no restrictions on transparency and birefringence. A guide groove is formed in a surface of the substrate; in a case where a metal or glass is used, a light or heat-curing thin resin layer is formed on the surface and a groove is formed in the resin layer. In this respect, it is preferable from the manufacturing viewpoint to use s plastic material and to simultaneously form the shape of the substrate 21 (particularly, a disc shape) and the guide groove in the surface by injection molding.

Examples of the plastic material injection moldable include polycarbonate resin, polyolefin resin, acrylic resin, epoxy resin and the like, which have been conventionally used for CD and DVD. The thickness of the substrate 21 is preferably approximately in a range of from 0.5 mm to 1.2 mm. The total thickness of the substrate and the cover layer is preferably set to 1.2 mm, which is the same as that of the conventional CD and DVD. This is because a case and others used for the conventional CD and DVD can be used as they are. It is stipulated for the Blu-Ray Disc that the thickness of the substrate is 1.1 mm and the thickness of the cover layer is 0.1 mm (Non-patent Document 9).

A guide groove for tracking is formed in the substrate 21. In the present embodiment, where the cover layer land part 25 is the recording groove part, the track pitch is desirably determined to be usually at least 0.1 μm, preferably at least 0.2 μm, and usually at most 0.6 μm, preferably at most 0.4 μm, in order to achieve a density higher than those of CD-R and DVD-R. The depth of the groove depends on the wavelength λ of the recording/reproducing light, $d_{GL}$, $d_G$, $d_L$ and so on, as described above, and it is preferably approximately in a range of from 30 nm to 70 nm. The groove depth is appropriately optimized within the above range in view of the reflectance $R_g$ of the recording groove part in the unrecorded state, the signal characteristics of the recording signal, the push-pull signal characteristics, the optical characteristics of the recording layer, and so on. For example, in order to achieve $R_g$ at an equal level against change in the optical characteristics of the recording layer, it is preferable to make the groove depth relatively shallower in the case of large $n_d$ and $k_d$, while it is preferable to make the groove depth relatively deeper in the case of small $n_d$ and $k_d$. Furthermore, even with the same groove depth, $R_g$ can be maintained at least 10% by selecting the recording layer with such values that $k_d$ is at most about 0.5 if $n_d$ is at least about 1.5, or with such values that $n_d$ is at most about 1.5 if $k_d$ is at least about 0.5.

Since the present embodiment utilizes the interference caused by the phase-difference between reflected light in the recording groove part and reflected light in the recording land part, the both are required to exist within a focused light spot. Therefore, the width of the recording groove (width of the cover layer land part 25) is preferably smaller than the spot diameter (diameter in the transverse direction of the groove) of the recording/reproducing light beam 27 on the surface of the recording layer 22. In a case where the track pitch is set to 0.32 μm in an optical system with the recording/reproducing light wavelength λ=405 nm and NA (numerical aperture) =0.85, the recording groove width is preferably in a range of from 0.1 μm to 0.2 μm. If the recording groove width is outside the above range, formation of the groove part or the land part often becomes difficult.

The guide groove usually has a rectangular shape. Particularly, when the recording layer is formed by coating described below, it is preferable that a dye should selectively remain on the substrate groove part for several ten seconds before almost all of a solvent in a solution containing the dye is evaporated. Thus it is also preferable to round off the corners of the substrate land part between rectangular grooves so that the dye solution can easily drop and remain in the substrate groove part. Such a groove shape with round corners is formed by exposing a surface of a plastic substrate or a stamper to plasma, UV/ozone or the like for a period of from several seconds to several minutes to etch it. Since the etching with plasma has the property of selectively etching sharp portions such as the corners of the groove part (edges of land part) in the substrate, it is suitable for formation of the round shape of the corners of the groove part.

In order to provide additional information such as an address and a synchronizing signal, the guide groove usually has an additional signal by groove shape modulation such as groove wobbling and groove depth modulation, uneven pits by intermittence of the recording groove part or the recording land part, and so on. For example, the Blu-Ray Disc adopts a wobble address system using two modulation methods of MSK (minimum-shift-keying) and STW (saw-tooth-wobbles) (Non-patent Document 9).

Layer with Light Reflection Function Comprising Ag as Main Component (Reflecting Layer)

The layer with the light reflection function comprising Ag as a main component (the reflecting layer 23) is a layer with a high reflectance for the wavelength of recording/reproducing light, preferably, one with a reflectance of at least 70% for the recording/reproducing light wavelength.

In general, materials showing a high reflectance for visible light used for the recording/reproducing wavelength include Au, Ag, Al and alloys comprising any one of them as a main component. Among them, it is preferable to adopt an alloy comprising Ag as a main component with a high reflectance and low absorption at λ=350 to 450 nm. Here, the phrase "comprising Ag as a main component" means that a content of Ag in the reflecting layer is at least 50 atomic %, preferably at least 80 atomic %, more preferably at least 90 atomic %, and particularly preferably at least 95 atomic %.

It is preferable to add Au, Cu, a rare earth element (particularly, Nd), Nb, Ta, V, Mo, Mn, Mg, Cr, Bi, Al, Si, Ge or the like in an amount of from 0.01 atomic % to 10 atomic % to Ag as the main component because corrosion resistance can be enhanced to moisture, oxygen, sulfur and the like. Besides, it is also possible to use a dielectric mirror consisting of a laminate of dielectric layers.

The thickness of the reflecting layer 23 is preferably equal to or less than $d_{GL}$, in order to maintain the groove level difference in the surface of the substrate 21. Similarly, at the recording/reproducing light wavelength λ=405 nm, the thickness of the reflecting layer is preferably at most 90 nm, more preferably at most 70 nm. The lower limit of the reflecting layer thickness is preferably at least 30 nm, more preferably at least 40 nm, except for the case of formation of a double layered medium. Surface roughness Ra of the reflecting layer 23 is preferably at most 5 nm, more preferably at most 1 nm.

Ag has a quality to increase flatness with use of an additive, and in this sense, it is preferable to use the above-mentioned additive element usually in an amount of at least 0.1 atomic %, preferably at least 0.5 atomic %. The reflecting layer 23 can be formed by a sputtering method, an ion plating method, an electron beam evaporation method, or the like.

Interlayer

The interlayer 30 is provided between the reflecting layer 23 and the recording layer 22. The jitter characteristics can be improved by existence of the interlayer 30.

The interlayer 30 usually contains an element selected from the group consisting of Ta, Nb, V, W, Mo, Cr and Ti in view of improvement in the jitter characteristics. Among them, the interlayer preferably contains at least one member selected from Ta, Nb, Mo and V and preferably contains either of Ta and Nb. Here, the interlayer 30 may contain only a single element among these elements or may contain at least two elements in an optional combination and at an optional ratio. Since the above elements have low reactivity and solid solubility with silver or a silver alloy widely used as the reflecting layer, it becomes possible to obtain an optical recording medium with excellent storage stability, with use of these elements as the interlayer 30.

The interlayer 30 preferably contains one of the above-mentioned elements as a main component. It is noted that in the present application, the "main component" means that the interlayer 30 contains at least 50 atomic % of one of the above elements among the elements constituting the interlayer 30. Among others, one of the above elements is preferably contained in a proportion of at least 70 atomic %, more preferably at least 90 atomic %, still more preferably at least 95 atomic %, and particularly preferably at least 99 atomic %. Ideally, one of the above elements is preferably contained in a proportion of 100 atomic %. It should be noted that when the interlayer 30 contains at least two of the above elements, a total content thereof preferably satisfies the above range.

The mechanism is not clearly understood yet about how the jitter characteristics are improved by existence of the interlayer 30. However, according to the study of the inventors of the present invention, it was found that the jitter characteristics tended to be improved when the interlayer 30 was comprised of an element with a hardness higher than that of the alloy comprising Ag as a main component used as the material for the reflecting layer 23 and/or when an element with large light absorption at the recording/reproducing wavelength was used for the interlayer 30.

On the other hand, no significant effect of reduction in jitter was obtained when a layer of the interlayer material was provided between the reflecting layer 23 and the substrate 21. From the foregoing, it is presumed that the interlayer 30 of the present invention has not only a function to control deformation on the substrate side by hardness but also an effect to control undesirable, incidental deformation by a function to control deformation and reaction between the reflecting layer and the recording layer. Furthermore, it is presumed that the interlayer 30 of the present invention has an appropriate light absorption function so that generation of heat is promoted on the reflecting layer side of the recording layer to promote decomposition of the recording layer and the like, thereby achieving good jitter characteristics. As for as only the light absorption effect and hardness are concerned, there is room for choice of another metal. However, the material for the interlayer 30 used in the present invention was selected, particularly, taking the following properties into consideration: the material has large light absorption and high hardness and even if the interlayer is formed in contact with the Ag alloy, the material is unlikely to cause mutual diffusion with the Ag alloy and is stable (low solid solubility in Ag as the main component to hardly form a solid solution).

Thus, it is presumed that it becomes easier to satisfy the above conditions when the interlayer 30 is made, particularly, from one of the above elements.

In addition, the interlayer 30 may contain an element other than the above elements as an additive element or an impurity element in order to impart a desirable property. Examples of the additive element or impurity element include Mg, Si, Ca, Mn, Fe, Co, Ni, Cu, Y, Zr, Pd, Hf, Pt and so on. These additive elements or impurity elements can be used singly, or in an optional combination of two or more elements at an optional ratio. The upper limit of the concentration of these additive elements or impurity elements in the interlayer 30 is usually at most about 5 atomic %.

The thickness of the interlayer 30 is usually at least 1 nm as a lower limit though the layer can exhibit its effect as long as it is formed at least as a film. On the other hand, when the thickness of the interlayer 30 becomes too thick, the light absorption of the interlayer becomes so large as to induce decrease in recording sensitivity and reflectance, and thus the thickness is usually at most 15 nm, preferably at most 10 nm, more preferably at most 5 nm. Within the above thickness range, it is feasible to achieve the jitter improvement and, appropriate reflectance and recording sensitivity all together.

The interlayer 30 can be formed by a sputtering method, an ion plating method, an electron beam evaporation method, or the like.

Recording Layer Comprising Dye as Main Component

The recording layer 22 contains a dye as a main component with the light absorption function for the wavelength of recording/reproducing light in the unrecorded state (before recording). Specifically, the dye contained as a main component in the recording layer 22 is preferably an organic compound with a distinguished absorption band due to its structure in the visible light (and its vicinity) wavelength range of from 300 nm to 800 nm.

The dye has absorption for the wavelength $\lambda$ of the recording/reproducing light beam 27 in the unrecorded state (before recording) in the form of the recording layer 22 and is altered by recording to make an optical change that is detectable as a change in intensity of reflected light of the reproducing light in the recording layer 22, and this dye will be called a "main component dye." The main component dye may be a mixture of a plurality of dyes to show the above-mentioned function.

A content of the main component dye in the recording layer 22 is preferably at least 50%, more preferably at least 80%, and still more preferably at least 90%, as percentages by weight.

The main component dye is preferably a single dye which shows absorption for the wavelength $\lambda$ of the recording/reproducing light beam 27 and which is altered by recording to make the optical change described above, and the main component dye may be a combination of dyes sharing the functions in such a manner that a dye shows absorption for the wavelength $\lambda$ of the recording/reproducing light beam 27 to generate heat and another dye is indirectly altered by the heat to cause the optical change. The main component dye may contain another dye as a so-called quencher for improving temporal stability (stability to temperature, humidity and light) of the dye with the light absorption function. Materials that can be contained besides the main component dye in the recording layer are a binding agent (binder) comprised of a low-molecular-weight or high-molecular-weight material, a dielectric material, and so on.

The main component dye is not particularly limited by structure. In the present embodiment, there are no severe restrictions on the optical characteristics in principle as long as the dye is one that makes a change of $\delta n_d>0$ in the recording layer 22 by recording and that has the extinction coefficient $k_d>0$ in the unrecorded state (before recording).

All that is required is that the main component dye shows absorption for the wavelength λ of the recording/reproducing light beam 27 and undergoes alteration by its own light absorption and heat generation to decrease the refractive index, $\delta n_d>0$. The alteration here is specifically a phenomenon of expansion, decomposition, sublimation, melting or the like due to the absorption and heat generation of the main component dye. The dye to be the main component itself may be altered to decrease the refractive index with some kind of structural change. Furthermore, the change of $\delta n_d>0$ may be one caused by formation of a cavity in the recording layer 22 and/or at the interface, or may be a reduction of the refractive index due to thermal expansion of the recording layer 22.

A temperature making such alteration is in a range of usually at least 100° C. and usually at most 500° C., preferably at most 350° C. From the viewpoint of storage stability and resistance to deterioration with the reproducing light, the temperature is further preferably at least 150° C. Moreover, the decomposition temperature is preferably at most 300° C. because the jitter characteristics tend to become better, particularly, at a high linear velocity of at least 10 m/s. The decomposition temperature is preferably at most 280° C. because the characteristics in high-speed recording are possibly further improved.

Normally, the alteration behavior is measured as a thermal characteristic of the main component dye, and rough behavior can be measured as a weight reduction start temperature by thermogravimetric-differential thermal analysis (TG-DTA). As described above, the simultaneous occurrence of $d_{bmp}<0$, i.e., deformation of expansion of the recording layer 22 toward the cover layer 24 is further preferable in view of making use of the phase change of $\Delta\phi>0$.

Therefore, the main component dye is preferably one with sublimation nature or one whose decomposition product is highly volatile enough to produce a pressure for expansion inside the recording layer 22.

The thickness of the recording layer 22 is usually at most 70 nm, preferably at most 50 nm, more preferably less than 50 nm, and further preferably at least 40 nm. On the other hand, the lower limit of the recording layer thickness is at least 5 nm and preferably at least 10 nm.

The dye as a main component in the recording layer may be a methine type, metal complex azo type, pyrone type, or porphyrin type compound, a mixture thereof, or the like. More specifically, the dye is preferably one of metal complex azo type dyes (cf. JP-A-9-277703, JP-A-10-026692, and so on) and pyrone dyes (JP-A-2003-266954) because they are originally excellent in light resistance, have the weight reduction start temperature $T_d$ of from 150° C. to 400° C. by TG-DTA, and have steep reduction characteristics (a decomposition compound thereof is highly volatile and a cavity is readily formed). A particularly preferable dye is a dye with $n_d$=1.2 to 1.9, $k_d$=0.3 to 1 and $T_d$=150° C. to 300° C. Among others, a metal complex azo type dye satisfying these properties is preferably applicable.

More specific examples of azo type dyes include metal complex compounds each composed of a coupler component of a 6-hydroxy-2-pyridone structure, a compound with any one diazo component selected from isoxazole, triazole and pyrazole, and a metal ion to which the organic dye compound coordinates. It is particularly preferable to use one of metal complex pyridone azo compounds having any one of structures represented by the following general formulae [I] to [III].

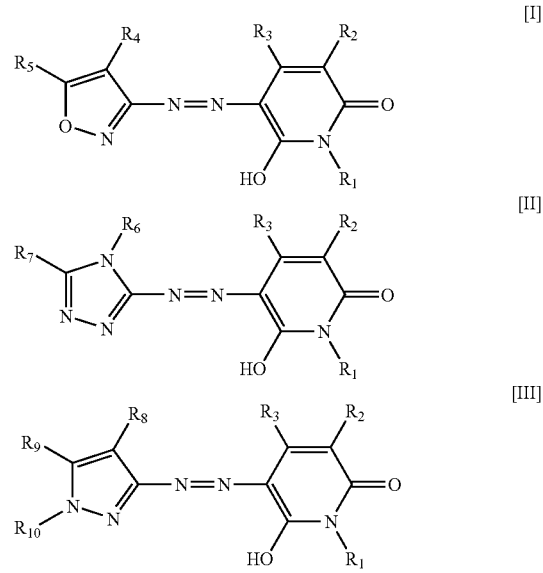

In the formulae [I] to [III], each of $R_1$ to $R_{10}$ independently is a hydrogen atom or a monovalent functional group.

It is also preferable to use one of metal complex cyclic β-diketone azo compounds each composed of a cyclic β-diketone azo compound represented by the general formula [IV] or [V] below, and a metal ion.

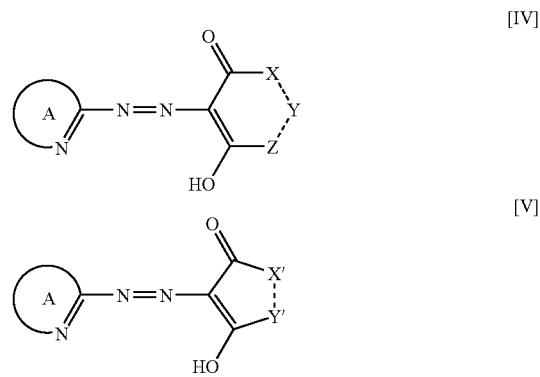

In the formula [IV] or [V], ring A is a nitrogen-containing heteroaromatic ring made with a carbon atom and an nitrogen atom, and each of X, X', Y, Y' and Z independently is a carbon atom which may have a substituent (including a spiro group) except for a hydrogen atom, an oxygen atom, a sulfur atom, a nitrogen atom represented by N—$R_{11}$, C=O, C=S or C=N$R_{12}$, and forms a 5 or 6-membered ring structure together with the β-diketone structure.

$R_{11}$ is a hydrogen atom, a linear or branched alkyl group, a cyclic alkyl group, an aralkyl group, an aryl group, a heterocyclic group, an acyl group represented by —COR$_{13}$ or an amino group represented by —NR$_{14}$R$_{15}$, $R_{12}$ is a hydrogen atom, a linear or branched alkyl group or an aryl group.

$R_{13}$ is a hydrocarbon group or a heterocyclic group, and each of $R_{14}$ and $R_{15}$ independently is a hydrogen atom, a hydrocarbon group or a heterocyclic group.

It is noted that each of the above-mentioned groups may be substituted as occasion may demand.

In a case where each of X, X', Y, Y' and Z independently is a carbon atom or a nitrogen atom represented by N—$R_{11}$, two adjacent atoms may be bound by a single bond or a double bond.

Furthermore, in a case where each of X, X', Y, Y' and Z independently is a carbon atom, a nitrogen atom represented by N—$R_{11}$, or C=$NR_{12}$, two adjacent atoms may be condensed to form a saturated or unsaturated hydrocarbon ring or heterocyclic ring.

It is also preferable to use one of metal complex azo type dyes each composed of a compound represented by the following general formula [VI], and a metal.

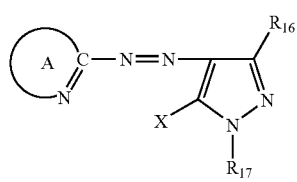

In the formula [VI], A is a residue forming a heteroaromatic ring together with a carbon atom and a nitrogen atom to which the ring A is bonded, X is a group having an active hydrogen, and each of $R_{16}$ and $R_{17}$ independently is a hydrogen atom or an optional substituent.

Furthermore, it is also preferable to use one of metal complex azo type dyes each composed of a compound represented by the following general formula [VII].

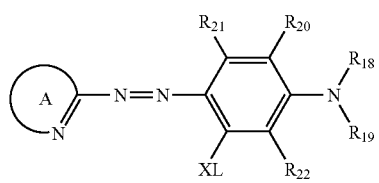

In the formula [VII], ring A is a nitrogen-containing heteroaromatic ring formed together with the carbon atom and the nitrogen atom, XL is a substituent in which X becomes an anion through elimination of L to permit coordination of a metal, each of $R_{18}$ and $R_{19}$ independently is a hydrogen atom, a linear or branched alkyl group, a cyclic alkyl group, an aralkyl group or an alkenyl group, which may form a condensed ring with adjacent substituents or with themselves.

Each of $R_{20}$, $R_{21}$ and $R_{22}$ independently is a hydrogen atom or an optional substituent.

These azo type dyes are preferably applicable because they have a main absorption band at wavelengths shorter than those of the azo type dyes conventionally used for CD-R and DVD-R and have the extinction coefficient $k_d$ around 400 nm as large as about 0.3 to 1.

The metal ion to be used may be one of bivalent metal ions of Ni, Co, Cu, Zn, Fe and Mn, and a dye containing Ni or Co is particularly preferred because of its excellent light resistance and high-temperature high-humidity environment resistance. It is noted that a metal complex azo type dye represented by the formula [VII] can also be used as a compound Y described below, with increase in wavelength.

More specifically, the pyrone dye is preferably one of compounds represented by the general formula [VIII] or [IX] below.

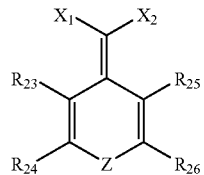

In the formula [VIII], each of $R_{23}$ to $R_{26}$ independently is a hydrogen atom or an optional substituent. $R_{23}$ and $R_{24}$, or, $R_{25}$ and $R_{26}$ may condense to form a hydrocarbon ring or heterocyclic ring structure. In that case, the hydrocarbon ring or heterocyclic ring may have a substituent.

$X_1$ is an electron-attracting group, $X_2$ is a hydrogen atom or -Q-Y (wherein Q represents a direct bond, a C1-C2 alkylene group, arylene group or a hetero arylene group, and Y is an electron-attracting group). The alkylene group, the arylene group and the hetero arylene group may have an optional substituent besides Y.

Z is —O—, —S—, —$SO_2$—, —$NR_{27}$— (wherein $R_{27}$ is a hydrogen atom, an optionally substituted hydrocarbon group, an optionally substituted heterocyclic group, a cyano group, a hydroxyl group, —$NR_{28}R_{29}$ (wherein each of $R_{28}$ and $R_{29}$ independently is a hydrogen atom, an optionally substituted hydrocarbon group, an optionally substituted heterocyclic group, or —$COR_{30}$ (wherein $R_{30}$ is an optionally substituted hydrocarbon group or an optionally substituted heterocyclic group)), or —$COR_{31}$ (wherein $R_{31}$ is an optionally substituted hydrocarbon group or an optionally substituted heterocyclic group).

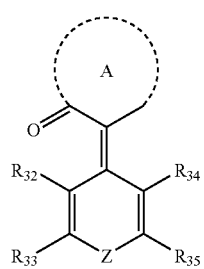

In the formula [IX], each of $R_{32}$ to $R_{35}$ is a hydrogen atom or an optional substituent. Alternatively, $R_{32}$ and $R_{33}$, or, $R_{34}$ and $R_{35}$ may condense to form a hydrocarbon ring or heterocyclic ring structure. In this case, the hydrocarbon ring or heterocyclic ring may have a substituent.

Ring A is a carbocyclic ketone ring or a heterocyclic ketone ring made with C=O, which may have a substituent, Z is —O—, —S—, —$SO_2$—, or —$NR_{36}$— (wherein $R_{36}$ is a hydrogen atom, an optionally substituted hydrocarbon group, an optionally substituted heterocyclic group, a cyano group, a hydroxyl group, —$NR_{37}R_{38}$ (wherein each of $R_{37}$ and $R_{38}$ independently is a hydrogen atom, an optionally substituted hydrocarbon group or an optionally substituted heterocyclic group, or —$COR_{40}$ (wherein $R_{40}$ is an optionally substituted hydrocarbon group or an optionally substituted heterocyclic group)).

Furthermore, in the optical recording medium 20 to which the present embodiment is applied, a dye X with $n_d$ larger than about 2 can be mixed with a dye or another organic or inorganic material with $n_c > n_d$ (mixture Y) so as to decrease the average $n_d$ of the recording layer 22 to the refractive index equal to or less than $n_c$.

The dye X is a dye which usually has $n_d > n_c$, particularly $n_d > 2$, the main absorption band of which lies on the long wavelength side of the recording/reproducing light wavelength, and which has a high refractive index. Such a dye may be preferably one having a main absorption band peak in a range of from 300 nm to 400 nm and a refractive index $n_d$ in a range of from 2 to 3.

Specific examples of the dye X include porphyrin, stylbene, (carbo)styryl, coumarin, pyrone, chalcone, triazole, methine (cyanine and oxonol), sulfonylimine, and azlactone type compounds, and mixtures thereof. It is particularly preferable to adopt one of coumarin type dyes (JP-A-2000-043423), carbostyryl type dyes (JP-A-2001-287466), the above-mentioned pyrone type dyes (JP-A-2003-266954) and the like are preferable because these dyes have a moderate decomposition or sublimation temperature. Moreover, it is also preferable to adopt one of phthalocyanine and naphthalocyanine compounds with a strong absorption band around 350 nm to 400 nm, which is not a main absorption band but absorption band comparable thereto, derivatives thereof and mixtures thereof.

The mixture Y may be a metal complex azo type dye with a main absorption band in a wavelength band of from 600 nm to 800 nm. It is desirable to use a dye suitable for use in the CD-R and DVD-R, which has the extinction coefficient $k_d$ of at most 0.2 and preferably at most 0.1 in the vicinity of 405 nm. Although the above-mentioned dye has the very high refractive index $n_d$ of at least 2.5 at the long wavelength end $\lambda_L$, the refractive index $n_d$ at the short wavelength end conveniently becomes about 1.5 because it is sufficiently far from the absorption peak.

More specifically, such a dye may be one of the metal complex azo type dyes represented by the general formula [X] disclosed in JP-A-6-65514.

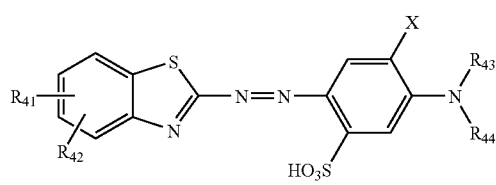

[X]

In the formula [X], each of $R_{41}$ and $R_{42}$ independently is a hydrogen atom, a halogen atom, a C1-C6 alkyl group, a fluorinated alkyl group, a branched alkyl group, a nitro group, a cyano group, —$COOR_{45}$, —$COR_{46}$, —$OR_{47}$ or —$SR_{48}$ (wherein each of $R_{45}$ to $R_{48}$ independently is a C1-C6 alkyl group, a fluorinated alkyl group, a branched alkyl group or a cyclic alkyl group), X is a hydrogen atom, a C1-C3 alkyl group, a branched alkyl group, —$OR_{49}$ or —$SR_{50}$ (wherein each of $R_{49}$ and $R_{50}$ is independently a C1-3 alkyl group), each of $R_{43}$ and $R_{44}$ is independently a hydrogen atom, a C1-C10 alkyl group, a branched alkyl group or a cyclic alkyl group, each of $R_{43}$ and $R_{44}$ may bond to the adjacent benzene ring, or $R_{43}$ and $R_{44}$ may form a ring with the nitrogen atom.

It is also preferable to use one of metal complex azo dyes each composed of a compound represented by the general formula [XI] disclosed in JP-A-2002-114922.

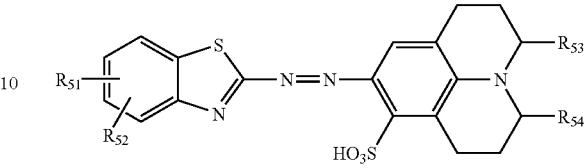

[XI]

In the formula [XI], each of $R_{51}$ and $R_{52}$ independently is a hydrogen atom, a halogen atom, a C1-C6 alkyl group, a fluorinated alkyl group, a branched alkyl group, a nitro group, a cyano group, —$COOR_{55}$, —$COR_{56}$, —$OR_{57}$ or —$SR_{58}$ (wherein each of $R_{55}$ to $R_{58}$ independently is a C1-C6 alkyl group, a fluorinated alkyl group, a branched alkyl group or a cyclic alkyl group), X is a hydrogen atom, a C1-C3 alkyl group, a branched alkyl group, —$OR_{59}$ or —$SR_{60}$ (wherein each of $R_{59}$ and $R_{60}$ independently is a C1-C3 alkyl group), and each of $R_{53}$ and $R_{54}$ independently is a hydrogen atom or a C1-C3 alkyl group.

In the present embodiment, the recording layer 22 is preferably formed by a coating method, a vacuum evaporation method or the like, and particularly preferably formed by a coating method. Namely, the above dye is dissolved as a main component with a binder, a quencher and the like in an appropriate solvent to prepare a coating solution for the recording layer 22 and the solution is applied on the above-mentioned reflecting layer 23.

A concentration of the main component dye in the solution is in a range of usually at least 0.01% by weight, preferably at least 0.1% by weight, more preferably at least 0.2% by weight, and usually at most 10% by weight, preferably at most 5% by weight, more preferably at most 2% by weight. By the above procedure, the recording layer 22 is formed in a thickness of usually about from 1 nm to 100 nm. In order to set the thickness to less than 50 nm, the dye concentration is set preferably to less than 1% by weight, more preferably less than 0.8% by weight. In addition, it is also preferable to further control a speed of rotation during the coating process.

Examples of the solvent for dissolving the main component dye material and others include alcohols such as ethanol, n-propanol, isopropanol, n-butanol and diacetone alcohol; fluorinated hydrocarbon type solvents such as tetrafluoropropanol (TFP) and octafluoropentanol (OFP); glycol ethers such as ethylene glycol monomethyl ether, ethylene glycol monoethyl ether and propylene glycol monomethyl ether; esters such as butyl acetate, ethyl lactate and cellosolve acetate; chlorinated hydrocarbons such as dichloromethane and chloroform; hydrocarbons such as dimethylcyclohexane; ethers such as tetrahydrofuran, ethyl ether and dioxane; ketones such as methyl ethyl ketone, cyclohexanone and methyl isobutyl ketone, and so on. The solvent is appropriately selected from these in consideration of solubility of the main component dye material and others to be dissolved therein, and two kinds or more of these solvents can be used as mixed.

The binder to be used may be an organic polymer such as a cellulose derivative, a natural polymer, a hydrocarbon resin, a vinyl resin, an acrylic resin, a polyvinyl alcohol or an epoxy resin.

Furthermore, the recording layer 22 may contain various dyes or an anti-fading agent besides the dyes in order to improve the light resistance. A singlet oxygen quencher is generally used as the anti-fading agent. An amount of the anti-fading agent such as the singlet oxygen quencher is usually at least 0.1% by weight, preferably at least 1% by weight, more preferably at least 5% by weight, and usually at most 50% by weight, preferably at most 30% by weight, more preferably at most 25% by weight, relative to the above-mentioned recording layer materials.

The coating method may be a spraying method, a spin-coating method, a dipping method, a roll coating method or the like, and the spin-coating method is particularly preferable for a disc-shaped recording medium because it can ensure uniformity of the film thickness and reduce a defect density.

Interface Layer

In the present embodiment, when an interface layer is provided between the recording layer 22 and the cover layer 24, it becomes feasible to make effective use of expansion of the recording layer 22 toward the cover layer 24.

The thickness of the interface layer is in a range of usually at least 1 nm, preferably at least 3 nm, more preferably at least 5 nm, and usually at most 50 nm, preferably at most 40 nm, more preferably at most 30 nm because the effect becomes prominent when formed as a film. When the thickness of the interface layer is controlled in this range, it is feasible to well control the expansion deformation toward the cover layer 24.

Reflection on the interface layer is desirably as small as possible. This is because the phase change of reflected light from the reflecting layer 23 as a main reflecting surface is selectively utilized. It is not preferable in the present embodiment that the interface layer be the main reflecting surface. For this reason, it is desirable that a difference between refractive indices of the interface layer and the recording layer 22 or between refractive indices of the interface layer and the cover layer 24 be small. In either case, the difference is preferably at most 1, more preferably at most 0.7, further preferably at most 0.5.

In the present embodiment, use of the interface layer makes it possible to make optional use of the following effects: to prevent formation of the mixing layer 25*m* as shown in FIG. 3; to prevent corrosion due to an adhesive used when the cover layer 24 is bonded to the recording layer 22 in the reverse stack; to prevent elution of the recording layer 22 due to a solvent used when the cover layer 24 is applied.

A material used for the interface layer is preferably one that is transparent to the wavelength of the recording/reproducing light and is chemically, mechanically and thermally stable. The term "transparent" herein means that the transmittance for the recording/reproducing light beam 27 is at least 80%, and the transmittance is more preferably at least 90%. The upper limit of the transmittance is 100%.

The interface layer is preferably a dielectric compound such as an oxide, a nitride, a carbide, or a sulfide of a metal, a semiconductor or the like, or a fluoride of magnesium (Mg), calcium (Ca), or the like, or a mixture thereof.

The refractive index of the interface layer is preferably one with a difference of at most 1 from those of the recording layer and the cover layer, and the value thereof is preferably in a range of from 1 to 2.5.

The deformation of the recording layer 22, particularly, the expansion deformation toward the cover layer 24 can be accelerated or depressed by the thickness and hardness of the interface layer. In order to effectively utilize the expansion deformation, a preferable material is a dielectric material with relatively low hardness, and a particularly preferable material is a material obtained by mixing ZnO, $In_2O_3$, $Ga_2O_3$, ZnS, a sulfide of a rare earth metal, or the like with an oxide, a nitride or a carbide of another metal or a semiconductor. Furthermore, it is also possible to use a plastic sputtered film and a plasma-polymerized film of hydrocarbon molecules.

Cover Layer

A material selected for the cover layer 24 is one that is transparent to the recording/reproducing light beam 27 and has less birefringence. The cover layer 24 is usually formed by bonding a plastic plate (called a sheet) with an adhesive or by applying a raw material solution and curing it with light, radiation, heat or the like. The cover layer 24 has the transmittance of preferably at least 70%, more preferably at least 80%, for the wavelength λ of the recording/reproducing light beam 27. Here, the upper limit of the transmittance is 100%.

The plastic used as a sheet material is polycarbonate, polyolefin, acrylic resin, cellulose triacetate, polyethylene terephthalate, or the like.

The cover layer is bonded with an adhesive such as a light-curing resin, a radiation-curing resin, a thermosetting resin or a pressure-sensitive adhesive. The pressure-sensitive adhesive may be an adhesive composed of any one of polymers of an acrylic type, a methacrylate type, a rubber type, a silicone type and a urethane type.

For example, a light-curing resin to constitute an adhesive layer is dissolved in an appropriate solvent to prepare a coating solution, the coating solution is applied onto the recording layer 22 or onto the interface layer to form a coating film, and a polycarbonate sheet is laminated on the coating film. Thereafter, the coating film is further extended and expanded, for example, by rotation of the medium in the laminated state as occasion may demand, and then the coating film is cured under irradiation with ultraviolet light from a UV lamp. Alternatively, a pressure-sensitive adhesive is preliminarily applied on a sheet, the sheet is laminated onto the recording layer 22 or onto the interface layer, and then an appropriate pressure is exerted thereon to press and bond them.

The above-mentioned pressure-sensitive adhesive is preferably an acrylic type or methacrylate type polymer adhesive in terms of transparency and durability. More specifically, a preferable adhesive is one obtained by copolymerizing 2-ethylhexyl acrylate, n-butyl acrylate, iso-octyl acrylate or the like as a main component monomer with a polar monomer such as acrylic acid, methacrylic acid, an acrylamide derivative, maleic acid, hydroxylethyl acrylate or glycidyl acrylate.

Physical properties such as a glass transition temperature Tg, tack performance (adhesion force immediately developed with contact at a low pressure), peeling strength and shear adhesion can be controlled by adjusting a molecular weight of the main component monomer, mixing a short-chain component, and/or adjusting a crosslinking point density with acrylic acid (Non-patent Document 11, Chapter 9).

Examples of solvents for the acrylic polymer include ethyl acetate, butyl acetate, toluene, methyl ethyl ketone, cyclohexane and so on. The above-mentioned adhesive preferably further contains a polyisocyanate crosslinking agent.

The pressure-sensitive adhesive can be one of the materials as described above, and the pressure-sensitive adhesive is uniformly applied in an appropriate amount onto a surface of the cover layer sheet material, which comes into contact with the recording layer side, and is dried to evaporate the solvent. Thereafter, a pressure is exerted on the surface on the recording layer side (a surface of the interface layer if it is present), for example, with a laminating roller to cure the adhesive. When the cover layer sheet material with the adhesive applied thereonto is bonded to the surface of the recording medium with the recording layer formed thereon, it is preferable to perform the bonding process in vacuum so as not to prevent air from being caught to form a bubble.

Alternatively, the above-mentioned pressure-sensitive adhesive is applied onto a release film and is dried to evaporate the solvent. Thereafter, the cover layer sheet is laminated thereon, the release film is then removed to form an integral laminate of the cover layer sheet and the adhesive layer, and the laminate is attached to the recording medium.

When the cover layer 24 is formed by the coating method, the spin-coating method, the dipping method or the like is used and the spin-coating method is often used, particularly, for the disc-shape medium. The material for the cover layer 24 formed by coating may be a resin such as a urethane, epoxy or acrylic resin, or the like, and the material after applied is irradiated with ultraviolet light, electron rays or radiation to cure by radical polymerization or cationic polymerization, thereby forming the cover layer.

In order to utilize the deformation toward the cover layer 24, at least a layer on the side of the cover layer 24 in contact with the recording layer 22 or the above-mentioned interface layer is preferably easy to follow the expansion deformation. The cover layer 24 preferably has moderate softness (hardness). For example, in a case where the cover layer 24 is composed of a sheet material of a resin with a thickness of from 50 μm to 100 μm and where the layer is bonded with a pressure-sensitive adhesive, the adhesive layer has a glass transition temperature as low as from −50° C. to 50° C. and is relatively soft, whereby the deformation toward the cover layer 24 becomes relatively large. The glass transition temperature is particularly preferably at most room temperature.

The thickness of the adhesive layer of the adhesive is usually in a range of at least 1 μm, preferably at least 5 μm and usually at most 50 μm, preferably at most 30 μm. It is preferable to provide the deformation-promoting layer for positively controlling the expansion deformation by control of the thickness, the glass transition temperature and the crosslinking density of the adhesive layer material. Alternatively, in the cover layer 24 formed by the coating method, it is also preferable to form it in a multilayer coating structure composed of a deformation-promoting layer with a thickness of usually at least 1 μm, preferably at least 5 μm and usually at most 50 μm, preferably at most 30 μm and with relatively low hardness, and a layer with the rest thickness of the cover layer, for controlling the deformation amount $d_{bmp}$.

As described above, in the case where the deformation-promoting layer composed of the pressure-sensitive adhesive, the adhesive, the protective coating material, or the like is formed on the recording layer (interface layer) side of the cover layer, the glass transition temperature thereof. Tg is preferably at most 25° C., more preferably at most 0° C. and further preferably at most −10° C. in order to impart a certain level of flexibility thereto. The glass transition temperature Tg here is a value measured after curing of the pressure-sensitive adhesive, the adhesive, the protective coating material, or the like.

A simple measurement method of Tg is differential scanning calorimetry (DSC). In addition, Tg can also be obtained by measuring a temperature dependence of storage elastic modulus with a dynamic viscoelasticity measuring apparatus (Non-patent Document 11, Chapter 5).

Such promotion of deformation can increase the signal amplitude of "LtoH" polarity and also provide an advantage that the recording power required for recording can be reduced. On the other hand, if the deformation is too large, crosstalk will increase and the push-pull signal will be too small. Therefore, the deformation-promoting layer should preferably maintain moderate viscoelasticity at the glass transition temperature or more.

In order to further provide the incident-light-side surface of the cover layer with functions of abrasion resistance and resistance to fingerprint adhesion, a layer with a thickness of about from 0.1 μm to 50 μm may be separately provided on the surface of the cover layer 24.

The thickness of the cover layer 24 is preferably in a range of usually at least 0.01 mm, preferably at least 0.05 mm and usually at most 0.3 mm, preferably at most 0.15 mm though it depends on the wavelength λ of the recording/reproducing light beam 27 and the NA (numerical aperture) of the objective lens 28. The total thickness including the thicknesses of the adhesive layer, a hard coat layer, and so on preferably falls within an optically allowable thickness range. For example, in the case of so-called Blu-Ray Disc, the thickness is preferably controlled to be approximately 100 μm±at most 3 μm.

If a layer with a different refractive index is provided on the recording layer side of the cover layer as in the case where the deformation-promoting layer is provided, the refractive index $n_c$ of the cover layer in the present invention refers to a refractive index value of the layer on the recording layer side.

Other Configurations

The optical recording medium of the present embodiment may have any layer other than the layers as described above or may be formed without a part of the above-described layers, without departing from the scope of the present invention.

For example, for prevention of contact and diffusion between the layers and/or for control of the phase-differences and reflectance, it is possible to interpose an interface layer, for example, between the substrate and the reflecting layer, as well as at the above-described interface between the recording layer 22 and the cover layer 24.

Moreover, the present invention can also be applied to a multilayer optical recording medium provided with a plurality of recording layers on a substrate. In this case, the interlayer may be provided between every pair of recording layer and reflecting layer, or the interlayer may be provided between only a specific pair of recording layer and reflecting layer according to circumstances.

EXAMPLES

Now, the present invention will be described in further detail referring to Examples. However, it should be understood that the present invention is by no means restricted such specific Examples.

Example 1

A reflecting layer with a thickness of about 65 nm was formed by sputtering of an alloy target with a composition of $Ag_{98.1}Nd_{1.0}Cu_{0.9}$ (the composition is indicated by atomic %), on a substrate of a polycarbonate resin in which a guide groove with a track pitch of 0.32 μm, a groove width of about 0.18 μm and a groove depth of about 55 nm was formed. An interlayer with a thickness of about 3 nm was formed by sputtering of Ta on the reflecting layer. Furthermore, a dye represented by the below structural formula was dissolved in octafluoropentanol (OFP) and the resulting solution was applied onto the above-mentioned interlayer by a spin-coating method to form a film.

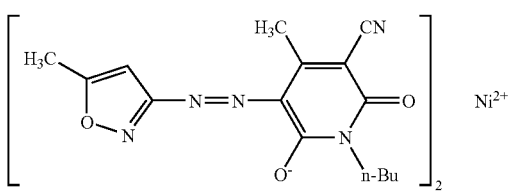

The conditions of the spin-coating method were as follows. Namely, 1.5 g of a solution obtained by dissolving the above dye in a concentration of 0.6% by weight in OFP was dispensed in a ring shape to the vicinity of the center of the disc (obtained by forming the reflecting layer and interlayer on the above-mentioned substrate), and the disc was rotated at 1200 rpm for 7 seconds to spread the dye solution. Thereafter, the disc was rotated at 9200 rpm for 3 seconds to sweep off the dye solution, thereby conducting coating. After the coating, the disc was maintained in an environment of 100° C. for one hour to evaporate and remove the solvent of OFP to form a recording layer. A thickness of the recording layer in the recording groove part was about 30 nm and a thickness thereof in the recording land part was nearly 0 nm (it was hard to recognize existence of the recording layer by observation with a cross-section TEM (Transmission Electron Microscope)).

Thereafter, an interface layer of ZnS—SiO$_2$ (molar ratio of 80:20) was formed in a thickness of about 20 nm on the above-mentioned recording layer by sputtering. Bonded onto the interface layer was a transparent cover layer with a total thickness of 100 μm comprised of a polycarbonate resin sheet with a thickness of 75 μm and a pressure-sensitive adhesive layer with a thickness of 25 μm, whereby an optical recording medium (optical recording medium of Example 1) was prepared.

Comparative Example 1

An optical recording medium was prepared in the same manner as in Example 1 except that the interlayer was omitted from the layers formed in the optical recording medium of Example 1.

Example 2

The following conditions were changed among those in Example 1. Namely, the groove depth of the guide groove formed on the substrate was changed to about 48 nm, the thickness of the reflecting layer was changed to about 70 nm, the material for the interlayer was changed to Nb, and the thickness of the interlayer was changed to about 3 nm. Furthermore, the spin coating of the dye for forming the recording layer was conducted as follows: 1.5 g of a solution obtained by dissolving the above dye in a concentration of 1.2% by weight in OFP was dispensed in a ring shape to the vicinity of the center of a disc (obtained by forming the reflecting layer and interlayer on the above-mentioned substrate), the disc was rotated at 120 rpm for 4 seconds, and then the disc was rotated at 1200 rpm for 3 seconds to spread the dye solution. Thereafter, the disc was rotated at 9200 rpm for 3 seconds to sweep off the dye solution, thereby conducting coating. In addition, ZnS—SiO$_2$ (molar ratio of 60:40) was used as a material for the interface layer, and the thickness of the interface layer was about 16 nm. While an optical recording medium was prepared, the other conditions were the same as those in Example 1.

Example 3

An optical recording medium was prepared under the same conditions as in Example 2 except that the thickness of the interlayer of Nb was changed to about 5 nm among the conditions in Example 2.

Comparative Example 2

An optical recording medium was prepared in the same manner as in Example 2 except that the interlayer was omitted from the layers formed in the optical recording medium of Example 2.

Example 4

A reflecting layer with a thickness of about 70 nm was formed by sputtering of an alloy target with a composition of $Ag_{99.45}Bi_{0.35}Nd_{0.20}$ (the composition is indicated by atomic %), on a substrate of a polycarbonate resin in which a guide groove with a track pitch of 0.32 μm, a groove width of about 0.18 μm and a groove depth of about 48 nm was formed. An interlayer with a thickness of about 3 nm was formed by sputtering of Nb on the reflecting layer. Furthermore, the same dye as in Example 1 was dissolved in octafluoropentanol (OFP) and the resulting solution was applied onto the above-mentioned interlayer by a spin-coating method to form a film.

The conditions of the spin-coating method were as follows. Namely, 1.5 g of a solution obtained by dissolving the above dye in a concentration of 0.7% by weight in OFP was dispensed in a ring shape to the vicinity of the center of the disc (obtained by forming the reflecting layer and interlayer on the above-mentioned substrate), and the disc was rotated at 120 rpm for 4 seconds and further rotated at 1200 rpm for 3 seconds to spread the dye solution. Thereafter, the disc was rotated at 9200 rpm for 3 seconds to sweep off the dye solution, thereby conducting coating. After the coating, the disc was maintained in an environment of 100° C. for one hour to evaporate and remove the solvent of OFP to form a recording layer.

Thereafter, an interface layer of ZnS—SiO$_2$ (molar ratio of 80:20) was formed in a thickness of about 16 nm on the above-mentioned recording layer by sputtering. Bonded onto the interface layer was a transparent cover layer with a total thickness of 100 μm comprised of a polycarbonate resin sheet with a thickness of 75 μm and a pressure-sensitive adhesive layer with a thickness of 25 μm, whereby an optical recording medium was prepared.

Comparative Example 3

An optical recording medium was prepared in the same manner as in Example 4 except that the interlayer was omitted from the layers formed in the optical recording medium of Example 4.

Comparative Example 4

Among the layers of the optical recording medium of Example 4, the order of lamination of the reflecting layer and the interlayer was reversed. Namely, an Nb layer was first formed in a thickness of about 3 nm by sputtering on the substrate and then a reflecting layer with a thickness of about 70 nm was formed by sputtering of an alloy target with a composition of $Ag_{99.45}Bi_{0.35}Nd_{0.20}$ (the composition was indicated by atomic %). An optical recording medium was prepared while the other conditions were the same as those in Example 4.

Evaluation Conditions

Evaluation was conducted basically with a measuring system complying with the recordable disc standard of Blu-Ray Disc (System Description Blu-ray Disc Recordable Format Version 1.1). Specifically, it was conducted as follows.

Evaluation of recording/reproduction in the optical recording media of Example 1 and Comparative Example 1 was conducted using an ODU1000 tester manufactured by Pulstec Industrial Co., Ltd. with an optical system having the recording/reproducing light wavelength λ of about 405 nm, NA (numerical aperture)=0.85, and the diameter of the focused beam spot of about 0.42 µm (at $1/e^2$ intensity). Recording/reproduction was carried out in the substrate groove part (in-groove).

Recording was carried out as follows: under a definition that 1× speed was a linear velocity of 4.92 m/s, a disc was rotated at 1× speed or 2× speed and mark-length modulated signals (17PP) modulated by the (1, 7) RLL-NRZI modulation method were recorded therein. The reference clock period T was 15.15 nsec at 1× speed (channel clock frequency 66 MHz) and 7.58 nsec at 2× speed (channel clock frequency 132 MHz). The recording conditions such as the recording power, recording pulses, etc. were adjusted so as to minimize the below-described jitter. Reproduction was carried at 1× speed and the jitter and reflectance were measured.

The measurement of jitter was carried out according to the following procedure. Specifically, a recording signal was subjected to waveform equalization by a limit equalizer (manufactured by Pulstec Industrial Co., Ltd.), and thereafter was binarized. The gain value of the limit equalizer was set at 5 dB. Thereafter, a distribution σ of time differences of rise edges and fall edges in the binarized signal from rise edges of a channel clock signal was measured with Time Interval Analyzer (manufactured by Yokogawa Electric Corporation). The channel clock period was defined as T, and the jitter (%) was measured by σ/T (Data to Clock Jitter).

Since the reflectance is proportional to a voltage output value from a reproducing detector, this voltage output value was normalized by a known reflectance $R_{ref}$ to obtain a normalized value.

The reflectance change before and after recording was checked with each of Examples 1-4 and Comparative Examples 1-4, and it was confirmed that the reflectance after recording was higher than the reflectance in an unrecorded part and thus the "LtoH" recording was achieved.

Actual values of reflectance were measured at 9T mark portions and at 9T space portions as mark portions by recording (recording pit parts) and as space parts between marks as unrecorded parts, respectively. Reflectances of a 9T mark portion with the highest reflectance among signals of the mark portions and a 9T space portion with the lowest reflectance among the space portions were defined as RH and RL, respectively, and a modulation index m was calculated according to the following equation.

$$m = (R_H - R_L)/R_H$$

Evaluation Results

The jitter σ, reflectances $R_H$, $R_L$ and modulation index m of the optical recording medium in Example 1 were σ=5.6%, $R_H$=29.0%, $R_L$=12.3% and m=0.58 in 1× speed recording, and σ=6.4%, $R_H$=28.7%, $R_L$=12.1% and m=0.58 in 2× speed recording. It is noted that the same properties are obtained in a case where an alloy with a composition of AgCuAuNd, AgBi or the like is used as a material for the reflecting layer.

On the other hand, the jitter σ, reflectances $R_H$, $R_L$ and modulation index m of the optical recording medium in Comparative Example 1 were σ=6.7%, $R_H$=37.1%, $R_L$=15.4% and m=0.58 in 1× speed recording, and σ=7.7%, $R_H$=37.4%, $R_L$=15.5% and m=0.58 in 2× speed recording.

The jitter σ, reflectances $R_H$, $R_L$ and modulation index m of the optical recording medium in Example 2 were σ=5.4%, $R_H$=32.6%, $R_L$=19.2% and m=0.41 in 1× speed recording, and σ=6.1%, $R_H$=32.3%, $R_L$=18.8% and m=0.42 in 2× speed recording.

The jitter σ, reflectances $R_H$, $R_L$ and modulation index m of the optical recording medium in Example 3 were σ=5.7%, $R_H$=25.8%, $R_L$=14.3% and m=0.45 in 1× speed recording, and σ=6.4%, $R_H$=25.5%, $R_L$=13.5% and m=0.47 in 2× speed recording.

On the other hand, the jitter σ, reflectances $R_H$, $R_L$ and modulation index m of the optical recording medium in Comparative Example 2 were σ=6.2%, $R_H$=39.1%, $R_L$=23.5 and m=0.40 in 1× speed recording, and σ=7.0%, $R_H$=39.3%, $R_L$=23.6% and m=0.40 in 2× speed recording.

The jitter σ of the optical recording medium in Example 4 was σ=6.1% in 1× speed recording and σ=6.2% in 2× speed recording.

On the other hand, the jitter σ of the optical recording medium in Comparative Example 3 was σ=8.3% in 1× speed recording.

Furthermore, the jitter σ of the optical recording medium in Comparative Example 4 was σ=7.5% in 1× speed recording.

In the optical recording medium of Comparative Example 1, good jitter values of 6.7% in 1× speed recording and 7.7% in 2× speed recording were also obtained. However, it failed to satisfy the jitter stipulated by the Blu-Ray Disc standard (at most 6.5%). On the other hand, the jitter of the optical recording medium of Example 1 was improved in both of 1× speed recording and 2× speed recording relative to that of the optical recording medium of Comparative Example 1, and it was thus confirmed that the recording signal characteristics was improved by formation of the interlayer.

Furthermore, in the optical recording medium of Comparative Example 2, good jitter values were obtained, but it failed to satisfy the jitter stipulated by the Blu-Ray Disc standard (at most 6.5%). On the other hand, the jitter of the optical recording media of Example 2 and Example 3, was improved in both of 1× speed recording and 2× speed recording relative to that of the optical recording medium of Comparative Example 2, and it was thus confirmed that the recording signal characteristics was improved by formation of the interlayer.

Moreover, in the optical recording media of Comparative Examples 3 and 4, no good jitter values were obtained even in 1× speed recording. On the other hand, the jitter of the optical recording medium of Example 4 was improved relative to that of the optical recording media of Comparative Example 3 and Comparative Example 4, and it was thus confirmed that the recording signal characteristics was improved by formation of the interlayer.

It is apparent from the foregoing results that an excellent optical recording medium satisfying the Blu-Ray Disc standard in both of 1× speed recording and 2× speed recording is obtained by formation of the interlayer as defined in the present invention.

INDUSTRIAL APPLICABILITY

The present invention is applicable to various optical recording media and, among others, the present invention is especially preferably utilized for the blue-laser-compatible film-surface incidence type optical recording media with a recording layer comprising a dye as a main component.

The entire disclosure of Japanese Patent Application No. 2006-006567 filed on Jan. 13, 2006 including the specification, claims, drawings and summary is incorporated herein by reference in its entirety.

The invention claimed is:

1. An optical recording medium comprising:
a substrate with a guide groove formed therein,
a layer with a light reflection function comprising Ag as a main component, a recording layer comprising a dye as a main component with a light absorption function for a wavelength of recording/reproducing light in an unrecorded state, and a cover layer capable of transmitting the recording/reproducing light incident to the recording layer, in the order mentioned, on the substrate,
wherein an interlayer is provided between the layer with the light reflection function and the recording layer, and
wherein the interlayer contains at least one element selected from the group consisting of Ta, Nb, V, W, Mo, Cr and Ti.

2. The optical recording medium according to claim 1, wherein the interlayer has a thickness of at least 1 nm and at most 15 nm.

3. The optical recording medium according to claim 1, wherein the layer with the light reflection function comprising Ag as a main component has a thickness of at least 30 nm and at most 90 nm.

4. The optical recording medium according to claim 1, wherein when a recording groove part is a guide groove part on the far side from a surface where a recording/reproducing light beam resulting from focusing of the recording/reproducing light is incident to the cover layer, a reflected light intensity of a recorded pit portion formed in the recording groove part is higher than a reflected light intensity of the recording groove part in the unrecorded state.

5. The optical recording medium according to claim 4, wherein the recording layer has a thickness of at least 5 nm and at most 70 nm in the recording groove part in the unrecorded state.

6. The optical recording medium according to claim 4, wherein the recording layer has a thickness of at most 10 nm between the recording groove parts in the unrecorded state.

7. The optical recording medium according to claim 1, wherein the recording/reproducing light has the wavelength $\lambda$ of at least 350 nm and at most 450 nm.

8. The optical recording medium according to claim 1, further comprising an interface layer provided between the recording layer and the cover layer to prevent interfusion of a material of the recording layer and a material of the cover layer.

9. The optical recording medium according to claim 8, wherein the interface layer has a thickness of at least 1 nm and at most 50 nm.

10. The optical recording medium according to claim 1, wherein the interlayer contains at least one element selected from the group consisting of Ta and Nb.

11. The optical recording medium according to claim 2, wherein when a recording groove part is a guide groove part on the far side from a surface where a recording/reproducing light beam resulting from focusing of the recording/reproducing light is incident to the cover layer, a reflected light intensity of a recorded pit portion formed in the recording groove part is higher than a reflected light intensity of the recording groove part in the unrecorded state.

12. The optical recording medium according to claim 3, wherein when a recording groove part is a guide groove part on the far side from a surface where a recording/reproducing light beam resulting from focusing of the recording/reproducing light is incident to the cover layer, a reflected light intensity of a recorded pit portion formed in the recording groove part is higher than a reflected light intensity of the recording groove part in the unrecorded state.

13. The optical recording medium according to claim 5, wherein the recording layer has a thickness of at most 10 nm between the recording groove parts in the unrecorded state.

14. The optical recording medium according to claim 2, wherein the recording/reproducing light has the wavelength $\lambda$ of at least 350 nm and at most 450 nm.

15. The optical recording medium according to claim 3, wherein the recording/reproducing light has the wavelength $\lambda$ of at least 350 nm and at most 450 nm.

16. The optical recording medium according to claim 4, wherein the recording/reproducing light has the wavelength $\lambda$ of at least 350 nm and at most 450 nm.

17. The optical recording medium according to claim 5, wherein the recording/reproducing light has the wavelength $\lambda$ of at least 350 nm and at most 450 nm.

18. The optical recording medium according to claim 6, wherein the recording/reproducing light has the wavelength $\lambda$ of at least 350 nm and at most 450 nm.

* * * * *